US011077327B1

(12) United States Patent
Sava Gallis et al.

(10) Patent No.: US 11,077,327 B1
(45) Date of Patent: Aug. 3, 2021

(54) DEGRADATION OF CHEMICAL AGENTS USING METAL-ORGANIC FRAMEWORK COMPOSITIONS

(71) Applicant: National Technology & Engineering Solutions of Sandia, LLC, Albuquerque, NM (US)

(72) Inventors: Dorina F. Sava Gallis, Albuquerque, NM (US); Mark D. Tucker, Albuquerque, NM (US); Mark K. Kinnan, Albuquerque, NM (US); Jeffery A. Greathouse, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 346 days.

(21) Appl. No.: 16/201,224

(22) Filed: Nov. 27, 2018

Related U.S. Application Data

(60) Provisional application No. 62/591,125, filed on Nov. 27, 2017.

(51) Int. Cl.
  *A62D 3/30* (2007.01)
  *B01J 31/16* (2006.01)
  *A62D 101/26* (2007.01)
  *A62D 101/02* (2007.01)

(52) U.S. Cl.
  CPC .......... *A62D 3/30* (2013.01); *B01J 31/1691* (2013.01); *A62D 2101/02* (2013.01); *A62D 2101/26* (2013.01)

(58) Field of Classification Search
  CPC .. A62D 3/30; A62D 2101/02; A62D 2101/26; B01J 31/1691
  USPC ...................................................... 588/313
  See application file for complete search history.

(56) References Cited

U.S. PATENT DOCUMENTS

| | | | |
|---|---|---|---|
| 6,566,574 B1 | 5/2003 | Tadros et al. |
| 6,723,890 B2 | 4/2004 | Tucker et al. |
| 7,125,497 B1 | 10/2006 | Tucker et al. |
| 7,271,137 B2 | 9/2007 | Tucker et al. |
| 7,276,468 B1 | 10/2007 | Tucker |
| 7,282,470 B2 | 10/2007 | Tucker et al. |
| 7,390,432 B2 | 6/2008 | Tucker |
| 7,514,493 B1 | 4/2009 | Moore et al. |
| 7,662,759 B1 | 2/2010 | Tucker et al. |
| 7,750,199 B1 | 7/2010 | Tucker |
| 7,790,134 B1 | 9/2010 | Rai et al. |
| 7,850,865 B1 | 12/2010 | Tucker et al. |
| 8,012,411 B1 | 9/2011 | Betty et al. |
| 8,022,265 B2 | 9/2011 | Tucker |
| 8,241,562 B1 | 8/2012 | Betty et al. |
| 8,709,487 B1 | 4/2014 | Kinnan et al. |
| 8,741,174 B1 | 6/2014 | Tucker |
| 9,074,195 B1 | 7/2015 | Kinnan et al. |
| 9,117,560 B1 | 8/2015 | Garino et al. |
| 9,162,914 B1 | 10/2015 | Nenoff et al. |
| 9,343,192 B2 | 5/2016 | Garino et al. |
| 9,440,217 B1 | 9/2016 | Moore et al. |
| 9,443,627 B1 | 9/2016 | Moore et al. |
| 9,552,897 B2 | 1/2017 | Nenoff et al. |
| 9,662,632 B1 | 5/2017 | Allendorf et al. |
| 9,741,945 B1 | 8/2017 | Nenoff et al. |
| 9,834,649 B1 | 12/2017 | Kinnan et al. |
| 2013/0121911 A1 | 5/2013 | Nenoff et al. |
| 2016/0169854 A1 | 6/2016 | Greathouse et al. |
| 2018/0053968 A1 | 2/2018 | Sava Gallis et al. |

FOREIGN PATENT DOCUMENTS

WO  WO 1999/019707 A1  4/1999

OTHER PUBLICATIONS

U.S. Appl. No. 14/534,596, filed Nov. 6, 2014, Tucker et al.
U.S. Appl. No. 15/269,745, filed Sep. 19, 2016, Nenoff et al.
U.S. Appl. No. 15/664,507, filed Jul. 31, 2017, Sava Gallis et al.
U.S. Appl. No. 15/676,628, filed Aug. 14, 2017, Burton et al.
U.S. Appl. No. 15/994,904, filed May 31, 2018, Sava Gallis et al.
Addicoat MA et al., "Extension of the universal force field to metal-organic frameworks," *J. Chem. Theory Comput.* 2014;10:880-91.
Alam TM et al., "Sub-equimolar hydrolysis and condensation of organophosphates," *ChemistrySelect* 2016;1:2698-705.
Atzori C et al., "Effect of benzoic acid as a modulator in the structure of UiO-66: an experimental and computational study," *J. Phys. Chem. C* 2017;121:9312-24.
Bai Y et al., "Zr-based metal-organic frameworks: design, synthesis, structure, and applications," *Chem. Soc. Rev.* 2016;45:2327-67.
Baroni S et al., "Phonons and related crystal properties from density-functional perturbation theory," *Rev. Mod. Phys.* 2001;73:515-62.
Blinov V et al., "Decontamination of paraoxon and parathion on sensitive equipment materials by catalytic methanolysis," *Ind. Eng. Chem. Res.* 2014;53:13856-61.
Blöchl PE, "Projector augmented-wave method," *Phys. Rev. B* 1994;50:17953-79.
Bobbitt NS et al., "Metal-organic frameworks for the removal of toxic industrial chemicals and chemical warfare agents," *Chem. Soc. Rev.* 2017;46:3357-85.
Bueken B et al., "Gel-based morphological design of zirconium metal-organic frameworks," *Chem. Sci.* 2017;8:3939-48.
Canepa P et al., "J-ICE: a new Jmol interface for handling and visualizing crystallographic and electronic properties," *J. Appl. Cryst.* 2011;44:225-9.
Cavka JH et al., "A new zirconium inorganic building brick forming metal organic frameworks with exceptional stability," *J. Am. Chem. Soc.* 2008;130:13850-1.
DeCoste JB et al., "Metal-organic frameworks for air purification of toxic chemicals," *Chem. Rev.* 2014;114:5695-727.
Furukawa H et al., "The chemistry and applications of metal-organic frameworks," *Science* 2013;341:1230444 (12 pp.).
Giannozzi P et al., "Ab initio calculation of phonon dispersions in semiconductors," *Phys. Rev. B* 1991;43:7231-42.

(Continued)

Primary Examiner — Edward M Johnson
(74) Attorney, Agent, or Firm — Helen S. Baca; Kevin W. Bieg

(57) ABSTRACT

The present invention relates to a metal-organic framework composition, as well as constructs and methods thereof. In one particular example, the composition is employed to degrade a chemical agent in a non-aqueous environment.

10 Claims, 11 Drawing Sheets

(56) References Cited

OTHER PUBLICATIONS

Giannozzi P et al., "Vibrational and dielectric properties of $C_{60}$ from density-functional perturbation theory," *J. Chem. Phys.* 1994;100:8537-9.

Gil-San-Millan R et al., "Chemical warfare agents detoxification properties of zirconium metal-organic frameworks by synergistic incorporation of nucleophilic and basic sites," *ACS Appl. Mater. Interfaces* 2017;9:23967-73.

Greathouse JA et al., "Molecular modeling insights into the adsorption and degradation of chemical warfare agents by metal organic frameworks," *Sandia Report No. SAND2017-11621C*, 2017 (18 pp.).

Grimme S et al., "A consistent and accurate ab initio parametrization of density functional dispersion correction (DFT-D) for the 94 elements H—Pu," *J. Chem. Phys.* 2010;132:154104 (19 pp.).

Grimme S et al., "Effect of the damping function in dispersion corrected density functional theory," *J. Comput. Chem.* 2011;32:1456-65.

Harvey J et al., "Molecular modeling insights into the adsorption and degradation of chemical warfare agents by metal organic frameworks," *Sandia Report No. SAND2017-8894C*, 2017 (26 pp).

Islamoglu T et al., "Cerium(IV) vs zirconium(IV) based metal-organic frameworks for detoxification of a nerve agent," *Chem. Mater.* 2017;29:2672-5.

Islamoglu T et al., "Presence versus proximity: the role of pendant amines in the catalytic hydrolysis of nerve agent simulant," *Angew. Chem. Int. Ed.* 2018;57:1949-53.

Jang YJ et al., "Update 1 of: Destruction and detection of chemical warfare agents," *Chem. Rev.* 2015;115:PR1-PR76.

Kaiser J, "U.N. experts find convincing evidence of large-scale sarin attack in Syria," Sep. 16, 2013, accessible at sciencemag.org/news/2013/09/un-experts-find-convincing-evidence-large-scale-sarin-attack-syria (8 pp.).

Karhánek D et al., "A density-functional study of the adsorption of methane-thiol on the (111) surfaces of the Ni-group metals: II. vibrational spectroscopy," *J. Phys. Condens. Matter* 2010;22:265006 (9 pp.).

Kassai M et al., "Hydrolysis of phosphatidylcholine by cerium(IV) releases significant amounts of choline and inorganic phosphate at lysosomal pH," *J. Inorg. Biochem.* 2011;105:215-23.

Katz MJ et al., "Exploiting parameter space in MOFs: a 20-fold enhancement of phosphate-ester hydrolysis with UiO-66-$NH_2$," *Chem. Sci.* 2015;6:2286-91.

Katz MJ et al., "Simple and compelling biomimetic metal-organic framework catalyst for the degradation of nerve agent simulants," *Angew. Chem. Int. Ed.* 2014;53:497-501.

Kresse G et al., "Ab initio molecular dynamics for liquid metals," *Phys. Rev. B.* 1993;47:558-61.

Kresse G et al., "Ab initio molecular-dynamics simulation of the liquid-metal-amorphous-semiconductor transition in germanium," *Phys. Rev. B* 1994;49:14251-69.

Kresse G et al., "Efficiency of ab-initio total energy calculations for metals and semiconductors using a plane-wave basis set," *Comput. Mater. Sci.* 1996;6:15-50.

Kresse G et al., "Efficient iterative schemes for ab initio total-energy calculations using a plane-wave basis set," *Phys. Rev. B* 1996;54:11169-86.

Kresse G et al., "From ultrasoft pseudopotentials to the projector augmented-wave method," *Phys. Rev. B* 1999;59:1758-75.

Lee DT et al., "Catalytic "MOF-Cloth" formed via directed supramolecular assembly of UiO-66-$NH_2$ crystals on atomic layer deposition-coated textiles for rapid degradation of chemical warfare agent simulants," *Chem. Mater.* 2017;29:4894-903.

Ling S et al., "Dynamic acidity in defective UiO-66," *Chem. Sci.* 2016;7:4706-12.

López-Maya E et al., "Textile/metal-organic-framework composites as self-detoxifying filters for chemical-warfare agents," *Angew. Chem. Int. Ed.* 2015;54:6790-4.

Lu AX et al., "MOFabric: electrospun nanofiber mats from PVDF/UiO-66-$NH_2$ for chemical protection and decontamination," *ACS Appl. Mater. Interfaces* 2017;9:13632-6).

Melnychuk SA et al., "Catalytic decomposition of simulants for chemical warfare V agents: highly efficient catalysis of the methanolysis of phosphonothioate esters," *Angew. Chem. Int. Ed.* 2006;45:1767-70.

Mondloch JE et al., "Destruction of chemical warfare agents using metal-organic frameworks," *Nat. Mater.* 2015;14:512-6.

Moon SY et al., "Effective, facile, and selective hydrolysis of the chemical warfare agent VX using $Zr_6$-based metal-organic frameworks," *Inorg. Chem.* 2015;54:10829-33.

Perdew JP et al., "Restoring the density-gradient expansion for exchange in solids and surfaces," *Phys. Rev. Lett.* 2008;100:136406 (4 pp.).

Peterson GW et al., "Tailoring the pore size and functionality of UiO-type metal-organic frameworks for optimal nerve agent destruction," *Inorg. Chem.* 2015;54:9684-6.

Ploskonka AM et al., "Tailoring the adsorption and reaction chemistry of the metal-organic frameworks UiO-66, UiO-66-$NH_2$, and HKUST-1 via the incorporation of molecular guests," *ACS. Appl. Mater. Interfaces* 2017;9:21579-85.

Rappe AK et al., "Charge equilibrium for molecular dynamics simulations," *J. Phys. Chem.* 1991;95:3358-63.

Sava Gallis DF et al., "Biocompatible MOFs with high absolute quantum yield for bioimaging in the second near infrared window," *CrystEngComm* 2018;20:5919-24.

Sava Gallis DF et al., "Efficient MOF-based degradation of organophosphorous compounds in non-aqueous environments," *J. Mater. Chem. A* 2018;6:3038-45.

Sava Gallis DF et al., "Multifunctional, tunable metal-organic framework materials platform for bioimaging applications," *ACS Appl. Mater. Interfaces* 2017;9:22268-77.

Sava Gallis DF et al., Supporting information for "Efficient MOF-based degradation of organophosphorous compounds in non-aqueous environments," *J. Mater. Chem. A* 2018;6:3038-45 (10 pp.).

Sava Gallis DF et al., Supporting information for "Multifunctional, tunable metal-organic framework materials platform for bioimaging applications," *ACS Appl. Mater. Interfaces* 2017;9:22268-77 (16 pp.).

Sava Gallis et al., "Insights into the MOF-based degradation of organophosphates in non-aqueous media: a combined experimental-modeling study," *Sandia Report No. SAND2017-8912C*, 2017 (26 pp.).

Sava Gallis et al., "Multifunctional MOF materials platform for biomedical applications," *Sandia Report No. SAND2017-3292C*, 2017 (18 pp.).

Totten RK et al., "Catalytic solvolytic and hydrolytic degradation of toxic metal paraoxon with La(catecholate)-functionalized porous organic polymers," *ACS Catal.* 2013;3:1454-9.

Trickett CA et al., "Definitive molecular level characterization of defects in UiO-66 crystals," *Angew. Chem. Int. Ed.* 2015;54:11162-7.

Troya D, "Reaction mechanism of nerve-agent decomposition with Zr-based metal organic frameworks," *J. Phys. Chem. C* 2016;120:29312-23.

Tsang JS et al., "Billion-fold acceleration of methanolysis of paraoxon promoted by La(OTf)$_3$ in methanol," *J. Am. Chem. Soc.* 2003;125:7602-7.

Valenzano L et al., "Disclosing the complex structure of UiO-66 metal organic framework: a synergic combination of experiment and theory," *Chem. Mater.* 2011;23:1700-18.

Wang G et al., "Mechanism and kinetics for reaction of the chemical warfare agent simulant, DMMP (g), with zirconium(IV) MOFs: an ultrahigh-vacuum and DFT study," *J. Phys. Chem. C* 2017;121:11261-72.

Weinberger MA et al., "Mechanism of the reaction of sarin with methanol in the presence of amines," *Can. J. Chem.* 1970;48:1358-61.

Yang YC et al., "Decontamination of chemical warfare agents," *Chem. Rev.* 1992;92:1729-43.

Zhao J et al., "Ultra-fast degradation of chemical warfare agents using MOF-nanofiber kebabs," *Angew. Chem. Int. Ed.* 2016;55:13224-8.

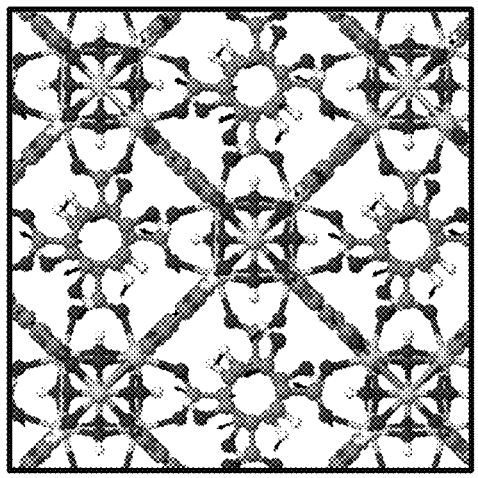
FIG. 7A — 1430 cm⁻¹ C-O-H bend + C=C stretch
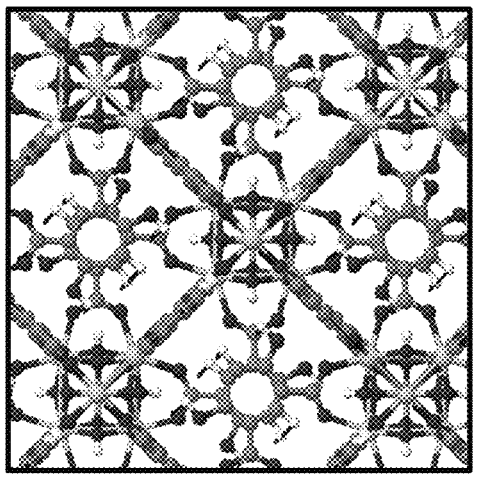
FIG. 7B — 1237 cm⁻¹ H-C=C-O-H bend
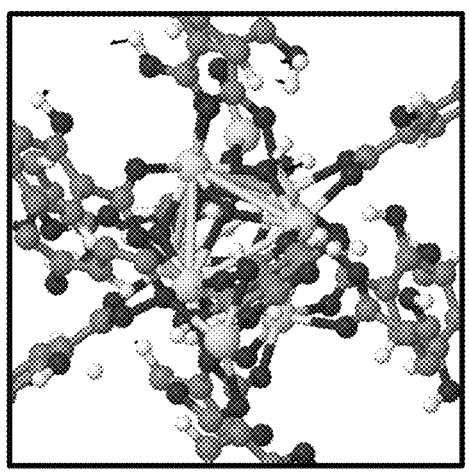
FIG. 7C — 1315 cm⁻¹ C-O-H at metal bend
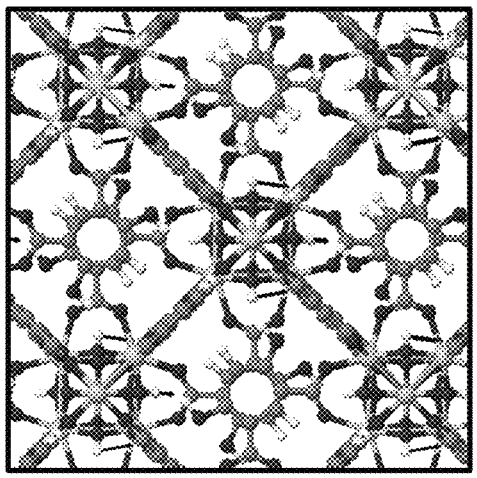
FIG. 7D — M-O-H bends

DEGRADATION OF CHEMICAL AGENTS USING METAL-ORGANIC FRAMEWORK COMPOSITIONS

CROSS-REFERENCE TO RELATED APPLICATION

This application claims the benefit of U.S. Provisional Application No. 62/591,125, filed Nov. 27, 2017, which is hereby incorporated by reference in its entirety.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to a metal-organic framework composition, as well as constructs and methods thereof. In one particular example, the composition is employed to react with chemical agents (e.g., any described herein) in non-aqueous reaction conditions.

BACKGROUND OF THE INVENTION

Decontamination of chemical agents can be challenging. Generally, research efforts focus on use of hydrolysis reactions under aqueous conditions for degrading chemical agents. Yet contaminated electronic components could benefit from a decontamination regimen that avoids use of water, which can damage circuitry. Thus, there is a need for understanding other methods and conditions for deactivating potentially hazardous chemical agents in non-aqueous, non-corrosive conditions.

SUMMARY OF THE INVENTION

The present invention provides a metal-organic framework (MOF) that promotes degradation of chemical agents (e.g., chemical warfare agents or simulants thereof, such as any herein) under non-aqueous reaction conditions. Accordingly, in a first aspect, the present invention features a method of catalytically degrading an agent (e.g., a chemical agent, such as an organophosphorous agent, a simulant thereof, or any agent described herein). In some embodiments, the method includes: providing a MOF composition (e.g., any described herein) including a plurality of metal clusters and a plurality of ligands coordinating with the plurality of metal clusters; and combining the MOF composition with the agent (e.g., the chemical agent) and a non-aqueous solvent (e.g., any described herein). In some embodiments, the method further includes: determining a rate of decomposition of the chemical agent.

In a second aspect, the present invention features a method of treating a contaminated article, the method including: applying a decontamination formulation to a surface of the contaminated article. In some embodiments, the decontamination formulation includes a MOF composition (e.g., any described herein) and a non-aqueous solvent (e.g., any described herein). In some embodiments, the MOF composition includes a plurality of metal clusters and a plurality of ligands coordinating with the plurality of metal clusters. In particular embodiments, the decontamination formulation includes a homogeneous mixture of the MOF composition and the non-aqueous solvent. In yet other embodiments, the decontamination formulation is provided as a spray, a solution, an emulsion, a foam, a liquid, a fog, a mist, or an aerosol.

In some embodiments, the method further includes: reapplying the decontamination formulation to the surface after about 15 minutes or longer (e.g., after about 20 minutes, 25 minutes, 30 minutes, 45 minutes, 1 hour, 1.5 hours, or longer).

In some embodiments, the contaminated article includes electronics or circuitry.

In a third aspect, the present invention features a method of forming a decontamination formulation, the method including: providing a MOF composition (e.g., including a plurality of metal clusters and a plurality of ligands coordinating with the plurality of metal clusters); and dispersing the MOF composition with a non-aqueous solvent (e.g., thereby forming a homogenous suspension). In some embodiments, the homogenous suspension includes the MOF that is present in an amount of from about 1 mol. % to about 50 mol. %.

In a fourth aspect, the present invention features a decontamination formulation including: a MOF composition (e.g., including a plurality of metal clusters and a plurality of ligands coordinating with the plurality of metal clusters) and a non-aqueous solvent. In some embodiments, the metal-organic framework is present in an amount of from about 1 mol. % to about 50 mol. % (e.g., of from 1 mol. % to 5 mol. %, 1 mol. % to 10 mol. %, 1 mol. % to 15 mol. %, 1 mol. % to 20 mol. %, 1 mol. % to 25 mol. %, 1 mol. % to 30 mol. %, 1 mol. % to 35 mol. %, 1 mol. % to 40 mol. %, 1 mol. % to 45 mol. %, 2 mol. % to 5 mol. %, 2 mol. % to 10 mol. %, 2 mol. % to 15 mol. %, 2 mol. % to 20 mol. %, 2 mol. % to 25 mol. %, 2 mol. % to 30 mol. %, 2 mol. % to 35 mol. %, 2 mol. % to 40 mol. %, 2 mol. % to 45 mol. %, 2 mol. % to 50 mol. %, 5 mol. % to 10 mol. %, 5 mol. % to 15 mol. %, 5 mol. % to 20 mol. %, 5 mol. % to 25 mol. %, 5 mol. % to 30 mol. %, 5 mol. % to 35 mol. %, 5 mol. % to 40 mol. %, 5 mol. % to 45 mol. %, 5 mol. % to 50 mol. %, 7 mol. % to 10 mol. %, 7 mol. % to 15 mol. %, 7 mol. % to 20 mol. %, 7 mol. % to 25 mol. %, 7 mol. % to 30 mol. %, 7 mol. % to 35 mol. %, 7 mol. % to 40 mol. %, 7 mol. % to 45 mol. %, 7 mol. % to 50 mol. %, 10 mol. % to 15 mol. %, 10 mol. % to 20 mol. %, 10 mol. % to 25 mol. %, 10 mol. % to 30 mol. %, 10 mol. % to 35 mol. %, 10 mol. % to 40 mol. %, 10 mol. % to 45 mol. %, 10 mol. % to 50 mol. %, 15 mol. % to 20 mol. %, 15 mol. % to 25 mol. %, 15 mol. % to 30 mol. %, 15 mol. % to 35 mol. %, 15 mol. % to 40 mol. %, 15 mol. % to 45 mol. %, 15 mol. % to 50 mol. %, 20 mol. % to 25 mol. %, 20 mol. % to 30 mol. %, 20 mol. % to 35 mol. %, 20 mol. % to 40 mol. %, 20 mol. % to 45 mol. %, 20 mol. % to 50 mol. %, 25 mol. % to 30 mol. %, 25 mol. % to 35 mol. %, 25 mol. % to 40 mol. %, 52 mol. % to 45 mol. %, 25 mol. % to 50 mol. %, 30 mol. % to 35 mol. %, 30 mol. % to 40 mol. %, 30 mol. % to 45 mol. %, 30 mol. % to 50 mol. %, 35 mol. % to 40 mol. %, 35 mol. % to 45 mol. %, 35 mol. % to 50 mol. %, 40 mol. % to 45 mol. %, 40 mol. % to 50 mol. %, or 45 mol. % to 50 mol. %).

In any embodiment herein, at least one of the plurality of metal clusters includes a metal ion, at least one of the plurality of ligands is a monodentate ligand, and at least one of the plurality of ligands is a bidentate ligand.

In any embodiment herein, at least one metal cluster includes a hexanuclear cluster (e.g., a hexanuclear cluster including Zr, Eu, Nd, Yb, Y, Tb, La, Ce, Pr, Sm, Gd, Dy, Ho, Er, Tm, and/or Lu).

In any embodiment herein, the plurality of metal clusters includes a first metal ion and a second metal ion that is different than the first metal ion.

In any embodiment herein, the plurality of metal clusters includes a first metal ion having a first coordination geometry and a second metal ion having a second coordination geometry that is different than the first coordinate geometry.

In any embodiment herein, the MOF composition includes a plurality of monodentate ligands and/or a plurality of bidentate ligands. In some embodiments, at least one of the plurality of ligands comprises a structure of $L^1$-$R^L$-$L^2$, wherein each of $L^1$ and $L^2$ is, independently, a reactive group (e.g., any described herein), and wherein $R^L$ is a linker (e.g., any described herein). In some embodiments, $R^L$ includes an optionally substituted aryl or an optionally substituted heteroaryl (e.g., an aryl substituted with one or more of a hydroxyl, optionally substituted alkyl, haloalkyl, hydroxyalkyl, optionally substituted alkoxy, optionally substituted cycloalkyl, optionally substituted cycloalkoxy, optionally substituted aryl, optionally substituted aryloxy, halo, carboxyl, azido, cyano, nitro, amino, aminoalkyl, or carboxyaldehyde). In other embodiments, each of $L^1$ and $L^2$ comprises, independently, carboxyl, heterocyclyl, hydroxyl, an anion thereof, a salt thereof, or an ester thereof.

In any embodiment herein, the plurality of metal clusters and plurality of ligands form a periodic framework.

In any embodiment herein, the MOF composition includes one or more particles that includes the plurality of metal clusters and the plurality of ligands.

In any embodiment herein, the MOF composition includes EuDOBDC, YDOBDC, NdDOBDC, YbDOBDC, TbDOBDC, $Nd_{0.67}Yb_{0.33}$DOBDC, $Nd_{0.46}Yb_{0.54}$DOBDC, UiO-66-DOBDC, UiO-66, UiO-67, NU-1000, MOF-808, or PCN-777.

In any embodiment herein, the non-aqueous solvent includes an alcohol (e.g., any described herein) or a hydrofluoroether (e.g., any described herein).

Definitions

As used herein, the term "about" means+/−10% of any recited value. As used herein, this term modifies any recited value, range of values, or endpoints of one or more ranges.

By "alkoxy" is meant —OR, where R is an optionally substituted alkyl group, as described herein. Exemplary alkoxy groups include methoxy, ethoxy, butoxy, trihaloalkoxy, such as trifluoromethoxy, etc. The alkoxy group can be substituted or unsubstituted. For example, the alkoxy group can be substituted with one or more substitution groups, as described herein for alkyl. Exemplary unsubstituted alkoxy groups include $C_{1-3}$, $C_{1-6}$, $C_{1-12}$, $C_{1-16}$, $C_{1-18}$, $C_{1-20}$, or $C_{1-24}$ alkoxy groups.

By "alkyl" and the prefix "alk" is meant a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic (e.g., $C_{3-24}$ cycloalkyl) or acyclic. The alkyl group can be branched or unbranched. The alkyl group can also be substituted or unsubstituted. For example, the alkyl group can be substituted with one, two, three or, in the case of alkyl groups of two carbons or more, four substituents independently selected from the group consisting of: (1) $C_{1-6}$ alkoxy (e.g., —OAk, in which Ak is an alkyl group, as defined herein); (2) $C_{1-6}$ alkylsulfinyl (e.g., —S(O)Ak, in which Ak is an alkyl group, as defined herein); (3) $C_{1-6}$ alkylsulfonyl (e.g., —$SO_2$Ak, in which Ak is an alkyl group, as defined herein); (4) amino (e.g., —$NR^{N1}R^{N2}$, where each of $R^{N1}$ and $R^{N2}$ is, independently, H or optionally substituted alkyl, or $R^{N1}$ and $R^{N2}$, taken together with the nitrogen atom to which each are attached, form a heterocyclyl group); (5) aryl; (6) arylalkoxy (e.g., —$OA^L$Ar, in which $A^L$ is an alkylene group and Ar is an aryl group, as defined herein); (7) aryloyl (e.g., —C(O)Ar, in which Ar is an aryl group, as defined herein); (8) azido (e.g., an —$N_3$ group); (9) cyano (e.g., a —CN group); (10) carboxyaldehyde (e.g., a —C(O)H group); (11) $C_{3-8}$ cycloalkyl; (12) halo; (13) heterocyclyl (e.g., a 5-, 6- or 7-membered ring, unless otherwise specified, containing one, two, three, or four non-carbon heteroatoms (e.g., independently selected from the group consisting of nitrogen, oxygen, phosphorous, sulfur, or halo)); (14) heterocyclyloxy (e.g., —OHet, in which Het is a heterocyclyl group); (15) heterocyclyloyl (e.g., —C(O)Het, in which Het is a heterocyclyl group); (16) hydroxyl (e.g., a —OH group); (17) N-protected amino; (18) nitro (e.g., an —$NO_2$ group); (19) oxo (e.g., an =O group); (20) $C_{3-8}$ spirocyclyl (e.g., an alkylene diradical, both ends of which are bonded to the same carbon atom of the parent group to form a spirocyclyl group); (21) $C_{1-6}$ thioalkoxy (e.g., —SAk, in which Ak is an alkyl group, as defined herein); (22) thiol (e.g., an —SH group); (23) —$CO_2R^A$, where $R^A$ is selected from the group consisting of (a) hydrogen, (b) $C_{1-6}$ alkyl, (c) $C_{4-18}$ aryl, and (d) $C_{1-6}$ alk-$C_{4-18}$ aryl; (24) —C(O)$NR^BR^C$, where each of $R^B$ and $R^C$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (25) —$SO_2R^{13}$, where $R^D$ is selected from the group consisting of (a) $C_{1-6}$ alkyl, (b) $C_{4-18}$ aryl, and (c) $C_{1-6}$ alk-$C_{4-18}$ aryl; (26) —$SO_2NR^ER^F$, where each of $R^E$ and $R^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; and (27) —$NR^GR^H$, where each of $R^G$ and $R^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkynyl, (f) $C_{4-18}$ aryl, (g) $C_{1-6}$ alk-$C_{4-18}$ aryl, (h) $C_{3-8}$ cycloalkyl, and (i) $C_{1-6}$ alk-$C_{3-8}$ cycloalkyl, wherein in one embodiment no two groups are bound to the nitrogen atom through a carbonyl group or a sulfonyl group. The alkyl group can be a primary, secondary, or tertiary alkyl group substituted with one or more substituents (e.g., one or more halo or alkoxy). In some embodiments, the unsubstituted alkyl group is a $C_{1-3}$, $C_{1-6}$, $C_{1-12}$, $C_{1-16}$, $C_{1-18}$, $C_{1-20}$, or $C_{1-24}$ alkyl group.

By "alkylene" is meant a multivalent (e.g., bivalent, trivalent, tetravalent, etc.) form of an alkyl group, as described herein. Exemplary alkylene groups include methylene, ethylene, propylene, butylene, etc. In some embodiments, the alkylene group is a $C_{1-3}$, $C_{1-6}$, $C_{1-12}$, $C_{1-16}$, $C_{1-18}$, $C_{1-20}$, $C_{1-24}$, $C_{2-3}$, $C_{2-6}$, $C_{2-12}$, $C_{2-16}$, $C_{2-18}$, $C_{2-20}$, or $C_{2-24}$ alkylene group. The alkylene group can be branched or unbranched. The alkylene group can also be substituted or unsubstituted. For example, the alkylene group can be substituted with one or more substitution groups, as described herein for alkyl.

By "amino" is meant —$NR^{N1}R^{N2}$, where each of $R^{N1}$ and $R^{N2}$ is, independently, H or optionally substituted alkyl, or $R^{N1}$ and $R^{N2}$, taken together with the nitrogen atom to which each are attached, form a heterocyclyl group, as defined herein.

By "aminoalkyl" is meant an alkyl group, as defined herein, substituted by an amino group, as defined herein.

By "aryl" is meant a group that contains any carbon-based aromatic group including, but not limited to, benzyl, naphthalene, phenyl, biphenyl, phenoxybenzene, anthracene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one, two, three, four, or five substituents independently selected from the group consisting of: (1) $C_{1-6}$ alkanoyl (e.g., —C(O)Ak, in which Ak is an alkyl group, as defined herein); (2) $C_{1-6}$ alkyl; (3) $C_{1-6}$ alkoxy (e.g., —OAk, in which Ak is an alkyl group, as defined herein); (4) $C_{1-6}$ alkoxy-$C_{1-6}$ alkyl (e.g., an alkyl group, which is substituted with an alkoxy group —OAk, in which Ak is an alkyl group, as defined herein); (5) $C_{1-6}$ alkylsulfinyl (e.g., —S(O)Ak, in which Ak is an alkyl group, as defined herein); (6) $C_{1-6}$ alkylsulfinyl-$C_{1-6}$ alkyl (e.g., an alkyl group, which is substituted by an alkylsulfinyl group —S(O)Ak, in which Ak is an alkyl group, as defined herein); (7) $C_{1-6}$ alkylsulfonyl (e.g., —$SO_2$Ak, in which Ak is an alkyl group, as defined herein); (8) $C_{1-6}$ alkylsulfonyl-$C_{1-6}$ alkyl (e.g., an alkyl group, which is substituted by an alkylsulfonyl group —$SO_2$Ak, in which Ak is an alkyl group, as defined herein); (9) aryl; (10) amino (e.g., —$NR^{N1}R^{N2}$, where each of $R^{N1}$ and $R^{N2}$ is, independently, H or optionally substituted alkyl, or $R^{N1}$ and $R^{N2}$, taken together with the nitrogen atom to which each are attached, form a heterocyclyl group); (11) $C_{1-6}$ aminoalkyl (e.g., meant an alkyl group, as defined herein, substituted by an amino group); (12) heteroaryl; (13) $C_{1-6}$ alk-$C_{4-18}$ aryl (e.g., -$A^L$Ar, in which $A^L$ is an alkylene group and Ar is an aryl group, as defined herein); (14) aryloyl (e.g., —C(O)Ar, in which Ar is an aryl group, as defined herein); (15) azido (e.g., an —$N_3$ group); (16) cyano (e.g., a —CN group); (17) $C_{1-6}$ azidoalkyl (e.g., a —$N_3$ azido group attached to the parent molecular group through an alkyl group, as defined herein); (18) carboxyaldehyde (e.g., a —C(O)H group); (19) carboxyaldehyde-$C_{1-6}$ alkyl (e.g., -$A^L$C(O)H, in which $A^L$ is an alkylene group, as defined herein); (20) $C_{3-8}$ cycloalkyl; (21) $C_{1-6}$ alk-$C_{3-8}$ cycloalkyl (e.g., -$A^L$Cy, in which $A^L$ is an alkylene group and Cy is a cycloalkyl group, as defined herein); (22) halo (e.g., F, Cl, Br, or I); (23) $C_{1-6}$haloalkyl (e.g., an alkyl group, as defined herein, substituted with one or more halo); (24) heterocyclyl; (25) heterocyclyloxy (e.g., —OHet, in which Het is a heterocyclyl group); (26) heterocyclyloyl (e.g., —C(O)Het, in which Het is a heterocyclyl group); (16) hydroxyl (e.g., a —OH group); (27) hydroxyl (e.g., a —OH group); (28) $C_{1-6}$ hydroxyalkyl (e.g., an alkyl group, as defined herein, substituted by one to three hydroxyl groups, with the proviso that no more than one hydroxyl group may be attached to a single carbon atom of the alkyl group); (29) nitro (e.g., an —$NO_2$ group); (30) $C_{1-6}$ nitroalkyl (e.g., an alkyl group, as defined herein, substituted by one to three nitro groups); (31)N-protected amino; (32) N-protected amino-$C_{1-6}$ alkyl; (33) oxo (e.g., an =O group); (34) $C_{1-6}$ thioalkoxy (e.g., —SAk, in which Ak is an alkyl group, as defined herein); (35) thio-$C_{1-6}$ alkoxy-$C_{1-6}$ alkyl (e.g., an alkyl group, which is substituted by an thioalkoxy group —SAk, in which Ak is an alkyl group, as defined herein); (36) —$(CH_2)_rCO_2R^A$, where r is an integer of from zero to four, and $R^A$ is selected from the group consisting of (a) hydrogen, (b) $C_{1-6}$ alkyl, (c) $C_{4-18}$ aryl, and (d) $C_{1-6}$ alk-$C_{4-18}$ aryl; (37) —$(CH_2)_rCONR^BR^C$, where r is an integer of from zero to four and where each $R^B$ and $R^C$ is independently selected from the group consisting of (a) hydrogen, (b) $C_{1-6}$ alkyl, (c) $C_{4-18}$ aryl, and (d) $C_{1-6}$ alk-$C_{4-18}$ aryl; (38) —$(CH_2)_rSO_2R^D$, where r is an integer of from zero to four and where $R^D$ is selected from the group consisting of (a) $C_{1-6}$ alkyl, (b) $C_{4-18}$ aryl, and (c) $C_{1-6}$ alk-$C_{4-18}$ aryl; (39) —$(CH_2)_rSO_2NR^ER^F$, where r is an integer of from zero to four and where each of $R^E$ and $R^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (40) —$(CH_2)_rNR^GR^H$, where r is an integer of from zero to four and where each of $R^G$ and $R^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkynyl, (f) $C_{4-18}$ aryl, (g) $C_{1-6}$ alk-$C_{4-18}$ aryl, (h) $C_{3-8}$ cycloalkyl, and (i) $C_{1-6}$ alk-$C_{3-8}$ cycloalkyl, wherein in one embodiment no two groups are bound to the nitrogen atom through a carbonyl group or a sulfonyl group; (41) thiol; (42) perfluoroalkyl (e.g., an alkyl group, as defined herein, having each hydrogen atom substituted with a fluorine atom); (43) perfluoroalkoxy (e.g., —ORf, in which Rf is an alkyl group, as defined herein, having each hydrogen atom substituted with a fluorine atom); (44) aryloxy (e.g., —OAr, where Ar is an optionally substituted aryl group, as described herein); (45) cycloalkoxy (e.g., —OCy, in which Cy is a cycloalkyl group, as defined herein); (46) cycloalkylalkoxy (e.g., —$OA^L$Cy, in which $A^L$ is an alkylene group and Cy is a cycloalkyl group, as defined herein); and (47) arylalkoxy (e.g., —$OA^L$Ar, in which $A^L$ is an alkylene group and Ar is an aryl group, as defined herein). In particular embodiments, an unsubstituted aryl group is a $C_{4-18}$, $C_{4-14}$, $C_{4-12}$, $C_{4-10}$, $C_{6-18}$, $C_{6-14}$, $C_{6-12}$, or $C_{6-10}$ aryl group.

By "arylene" is meant a multivalent (e.g., bivalent, trivalent, tetravalent, etc.) form of an aryl group, as described herein. Exemplary arylene groups include phenylene, naphthylene, biphenylene, triphenylene, diphenyl ether, acenaphthenylene, anthrylene, or phenanthrylene. In some embodiments, the arylene group is a $C_{4-18}$, $C_{4-14}$, $C_{4-12}$, $C_{4-10}$, $C_{6-18}$, $C_{6-14}$, $C_{6-12}$, or $C_{6-10}$ arylene group. The arylene group can be branched or unbranched. The arylene group can also be substituted or unsubstituted. For example, the arylene group can be substituted with one or more substitution groups, as described herein for aryl.

By "aryloxy" is meant —OR, where R is an optionally substituted aryl group, as described herein. In some embodiments, an unsubstituted aryloxy group is a $C_{4-18}$ or $C_{6-18}$ aryloxy group.

By "aryloxycarbonyl" is meant an aryloxy group, as defined herein, that is attached to the parent molecular group through a carbonyl group. In some embodiments, an unsubstituted aryloxycarbonyl group is a $C_{5-19}$ aryloxycarbonyl group.

By "aryloyl" is meant an aryl group that is attached to the parent molecular group through a carbonyl group. In some embodiments, an unsubstituted aryloyl group is a $C_{7-11}$ aryloyl group.

By "azido" is meant an —$N_3$ group.

By "azo" is meant an —N=N— group.

By "carbonyl" is meant a —C(O)— group, which can also be represented as >C=O.

By "carboxyaldehyde" is meant a —C(O)H group.

By "carboxyl" is meant a —$CO_2$H group.

By "cyano" is meant a —CN group.

By "cycloalkyl" is meant a monovalent saturated or unsaturated non-aromatic cyclic hydrocarbon group of from three to eight carbons, unless otherwise specified, and is exemplified by cyclopropyl, cyclobutyl, cyclopentyl, cyclohexyl, cycloheptyl, bicyclo[2.2.1]heptyl and the like. The cycloalkyl group can also be substituted or unsubstituted. For example, the cycloalkyl group can be substituted with one or more groups including those described herein for alkyl.

By "cycloalkoxy" is meant a cycloalkyl group, as defined herein, attached to the parent molecular group through an oxygen atom.

By "halo" is meant F, Cl, Br, or I.

By "haloalkyl" is meant an alkyl group, as defined herein, substituted with one or more halo.

By "heteroalkyl" is meant an alkyl group, as defined herein, containing one, two, three, or four non-carbon heteroatoms (e.g., independently selected from the group consisting of nitrogen, oxygen, phosphorous, sulfur, or halo).

By "heteroalkylene" is meant a divalent form of an alkylene group, as defined herein, containing one, two, three, or four non-carbon heteroatoms (e.g., independently selected from the group consisting of nitrogen, oxygen, phosphorous, sulfur, or halo).

By "heteroaryl" is meant a subset of heterocyclyl groups, as defined herein, which are aromatic, i.e., they contain 4n+2 pi electrons within the mono- or multicyclic ring system.

By "heterocyclyl" is meant a 5-, 6- or 7-membered ring, unless otherwise specified, containing one, two, three, or four non-carbon heteroatoms (e.g., independently selected from the group consisting of nitrogen, oxygen, phosphorous, sulfur, or halo). The 5-membered ring has zero to two double bonds and the 6- and 7-membered rings have zero to three double bonds. The term "heterocyclyl" also includes bicyclic, tricyclic and tetracyclic groups in which any of the above heterocyclic rings is fused to one, two, or three rings independently selected from the group consisting of an aryl ring, a cyclohexane ring, a cyclohexene ring, a cyclopentane ring, a cyclopentene ring, and another monocyclic heterocyclic ring, such as indolyl, quinolyl, isoquinolyl, tetrahydroquinolyl, benzofuryl, benzothienyl and the like. Heterocyclics include thiiranyl, thietanyl, tetrahydrothienyl, thianyl, thiepanyl, aziridinyl, azetidinyl, pyrrolidinyl, piperidinyl, azepanyl, pyrrolyl, pyrrolinyl, pyrazolyl, pyrazolinyl, pyrazolidinyl, imidazolyl, imidazolinyl, imidazolidinyl, pyridyl, homopiperidinyl, pyrazinyl, piperazinyl, pyrimidinyl, pyridazinyl, oxazolyl, oxazolidinyl, isoxazolyl, isoxazolidiniyl, morpholinyl, thiomorpholinyl, thiazolyl, thiazolidinyl, isothiazolyl, isothiazolidinyl, indolyl, quinolinyl, isoquinolinyl, benzimidazolyl, benzothiazolyl, benzoxazolyl, furyl, thienyl, thiazolidinyl, isothiazolyl, isoindazolyl, triazolyl, tetrazolyl, oxadiazolyl, uricyl, thiadiazolyl, pyrimidyl, tetrahydrofuranyl, dihydrofuranyl, tetrahydrothienyl, dihydrothienyl, dihydroindolyl, tetrahydroquinolyl, tetrahydroisoquinolyl, pyranyl, dihydropyranyl, dithiazolyl, benzofuranyl, benzothienyl, and the like.

By "hydroxyl" is meant —OH.

By "hydroxyalkyl" is meant an alkyl group, as defined herein, substituted by one to three hydroxyl groups, with the proviso that no more than one hydroxyl group may be attached to a single carbon atom of the alkyl group and is exemplified by hydroxymethyl, dihydroxypropyl, and the like.

By "nitro" is meant an —NO$_2$ group.

By "nitroalkyl" is meant an alkyl group, as defined herein, substituted by one to three nitro groups.

By "nitroso" is meant an —NO group.

By "oxo" is meant =O group.

By "oxy" is meant —O—.

By "perfluoroalkyl" is meant an alkyl group, as defined herein, having each hydrogen atom substituted with a fluorine atom. Exemplary perfluoroalkyl groups include trifluoromethyl, pentafluoroethyl, etc.

By "perfluoroalkylene" is meant an alkylene group, as defined herein, having each hydrogen atom substituted with a fluorine atom. Exemplary perfluoroalkylene groups include difluoromethylene, tetrafluoroethylene, etc.

By "perfluoroalkyleneoxy" is meant a perfluoroalkylene group, as defined herein, having an oxy group attached to either end of the perfluoroalkylene group. Exemplary perfluoroalkylene groups include, e.g., —OC$_f$F$_{2f}$— or —C$_f$F$_{2f}$O—, where f is an integer from about 1 to 5, and 2f is an integer that is 2 times f (e.g., difluoromethyleneoxy, tetrafluoroethyleneoxy, etc.).

By "perfluoroalkoxy" is meant an alkoxy group, as defined herein, having each hydrogen atom substituted with a fluorine atom.

By "phosphono" is meant a —P(O)(OH)$_2$ group.

By "phosphonoyl" is meant a —P(O)H— group.

By "phosphoric ester" is meant a —O—PO(OH)$_2$ group.

By "phosphoryl" is meant a —P(O)< group.

By "protecting group" is meant any group intended to protect a reactive group against undesirable synthetic reactions. Commonly used protecting groups are disclosed in "Greene's Protective Groups in Organic Synthesis," John Wiley & Sons, New York, 2007 (4th ed., eds. P. G. M. Wuts and T. W. Greene), which is incorporated herein by reference. O-protecting groups include an optionally substituted alkyl group (e.g., forming an ether with reactive group O), such as methyl, methoxymethyl, methylthiomethyl, benzoyloxymethyl, t-butoxymethyl, etc.; an optionally substituted alkanoyl group (e.g., forming an ester with the reactive group O), such as formyl, acetyl, chloroacetyl, fluoroacetyl (e.g., perfluoroacetyl), methoxyacetyl, pivaloyl, t-butylacetyl, phenoxyacetyl, etc.; an optionally substituted aryloyl group (e.g., forming an ester with the reactive group O), such as —C(O)—Ar, including benzoyl; an optionally substituted alkylsulfonyl group (e.g., forming an alkylsulfonate with reactive group O), such as —SO$_2$—R$^{S1}$, where R$^{S1}$ is optionally substituted C$_{1-12}$ alkyl, such as mesyl or benzylsulfonyl; an optionally substituted arylsulfonyl group (e.g., forming an arylsulfonate with reactive group O), such as —SO$_2$—R$^{S4}$, where R$^{S4}$ is optionally substituted C$_{4-18}$ aryl, such as tosyl or phenylsulfonyl; an optionally substituted alkoxycarbonyl or aryloxycarbonyl group (e.g., forming a carbonate with reactive group O), such as —C(O)—OR$^{T1}$, where R$^{T1}$ is optionally substituted C$_{1-12}$ alkyl or optionally substituted C$_{4-18}$ aryl, such as methoxycarbonyl, methoxymethylcarbonyl, t-butyloxycarbonyl (Boc), or benzyloxycarbonyl (Cbz); or an optionally substituted silyl group (e.g., forming a silyl ether with reactive group O), such as —Si—(R$^{T2}$)$_3$, where each R$^{T2}$ is, independently, optionally substituted C$_{1-12}$ alkyl or optionally substituted C$_{4-18}$ aryl, such as trimethylsilyl, t-butyldimethylsilyl, or t-butyldiphenylsilyl. N-protecting groups include, e.g., formyl, acetyl, benzoyl, pivaloyl, t-butylacetyl, alanyl, phenylsulfonyl, benzyl, Boc, and Cbz. Such protecting groups can employ any useful agent to cleave the protecting group, thereby restoring the reactivity of the unprotected reactive group.

By "salt" is meant an ionic form of a compound or structure (e.g., any formulas, compounds, or compositions described herein), which includes a cation or anion compound to form an electrically neutral compound or structure. Salts are well known in the art. For example, non-toxic salts are described in Berge S M et al., "Pharmaceutical salts," *J. Pharm. Sci.* 1977 January; 66(1):1-19; and in "Handbook of Pharmaceutical Salts: Properties, Selection, and Use,"

Wiley-VCH, April 2011 (2nd rev. ed., eds. P. H. Stahl and C. G. Wermuth. The salts can be prepared in situ during the final isolation and purification of the compounds of the invention or separately by reacting the free base group with a suitable organic acid (thereby producing an anionic salt) or by reacting the acid group with a suitable metal or organic salt (thereby producing a cationic salt). Representative anionic salts include acetate, adipate, alginate, ascorbate, aspartate, benzenesulfonate, benzoate, bicarbonate, bisulfate, bitartrate, borate, bromide, butyrate, camphorate, camphorsulfonate, chloride, citrate, cyclopentanepropionate, digluconate, dihydrochloride, diphosphate, dodecylsulfate, edetate, ethanesulfonate, fumarate, glucoheptonate, glucomate, glutamate, glycerophosphate, hemisulfate, heptonate, hexanoate, hydrobromide, hydrochloride, hydroiodide, hydroxyethanesulfonate, hydroxynaphthoate, iodide, lactate, lactobionate, laurate, lauryl sulfate, malate, maleate, malonate, mandelate, mesylate, methanesulfonate, methylbromide, methylnitrate, methylsulfate, mucate, 2-naphthalenesulfonate, nicotinate, nitrate, oleate, oxalate, palmitate, pamoate, pectinate, persulfate, 3-phenylpropionate, phosphate, picrate, pivalate, polygalacturonate, propionate, salicylate, stearate, subacetate, succinate, sulfate, tannate, tartrate, theophyllinate, thiocyanate, triethiodide, toluenesulfonate, undecanoate, valerate salts, and the like. Representative cationic salts include metal salts, such as alkali or alkaline earth salts, e.g., barium, calcium (e.g., calcium edetate), lithium, magnesium, potassium, sodium, and the like; other metal salts, such as aluminum, bismuth, iron, and zinc; as well as nontoxic ammonium, quaternary ammonium, and amine cations, including, but not limited to ammonium, tetramethylammonium, tetraethylammonium, methylamine, dimethylamine, trimethylamine, triethylamine, ethylamine, pyridinium, and the like. Other cationic salts include organic salts, such as chloroprocaine, choline, dibenzylethylenediamine, diethanolamine, ethylenediamine, methylglucamine, and procaine. Yet other salts include pharmaceutically acceptable salts, as described herein.

By "solvate" is meant a stabilized form of a compound or structure (e.g., any formulas, compounds, or compositions described herein, including anionic or cationic forms thereof) with one or more solvent molecules. Such forms can be stabilized by any useful interaction, such as electrostatic forces, van der Waals forces, or hydrogen bond formation. Exemplary solvates include hydrates (including one or more water molecules).

By "sulfinyl" is meant an —S(O)— group.

By "sulfo" is meant an —S(O)$_2$OH group.

By "sulfonyl" is meant an —S(O)$_2$— group.

By "anhydrate" is meant a form of a compound or structure (e.g., any formulas, compounds, or compositions described herein) generally lacking solvent molecules.

By "attaching," "attachment," or related word forms is meant any covalent or non-covalent bonding interaction between two components. Non-covalent bonding interactions include, without limitation, hydrogen bonding, ionic interactions, halogen bonding, electrostatic interactions, π bond interactions, hydrophobic interactions, inclusion complexes, clathration, van der Waals interactions, and combinations thereof.

By "pharmaceutically acceptable excipient" is meant any ingredient other than a compound or structure (e.g., any formulas, compounds, or compositions described herein) and having the properties of being nontoxic and non-inflammatory in a subject. Exemplary, non-limiting excipients include adjuvants, antiadherents, antioxidants, binders, carriers, coatings, compression aids, diluents, disintegrants, dispersing agents, dyes (colors), emollients, emulsifiers, fillers (diluents), film formers or coatings, flavors, fragrances, glidants (flow enhancers), isotonic carriers, lubricants, preservatives, printing inks, solvents, sorbents, stabilizers, suspensing or dispersing agents, surfactants, sweeteners, waters of hydration, or wetting agents. Any of the excipients can be selected from those approved, for example, by the United States Food and Drug Administration or other governmental agency as being acceptable for use in humans or domestic animals. Exemplary excipients include, but are not limited to alcohol, butylated hydroxytoluene (BHT), calcium carbonate, calcium phosphate (dibasic), calcium stearate, cellulose, croscarmellose, cross-linked polyvinyl pyrrolidone, citric acid, crospovidone, cysteine, ethylcellulose, gelatin, glucose, glycerol, hydroxypropyl cellulose, hydroxypropyl methylcellulose, lactated Ringer's solution, lactose, magnesium carbonate, magnesium stearate, maltitol, maltose, mannitol, methionine, methylcellulose, methyl paraben, microcrystalline cellulose, polyethylene glycol, polyol, polyvinyl pyrrolidone, povidone, pregelatinized starch, propyl paraben, retinyl palmitate, Ringer's solution, shellac, silicon dioxide, sodium carboxymethyl cellulose, sodium chloride injection, sodium citrate, sodium saccharine, sodium starch glycolate, sorbitol, starch (corn), stearic acid, stearic acid, sucrose, talc, talcum, titanium dioxide, vegetable oil, vitamin A, vitamin E, vitamin C, water, and xylitol.

By "pharmaceutically acceptable salt" is meant a salt that is, within the scope of sound medical judgment, suitable for use in contact with the tissues of humans and animals without undue toxicity, irritation, allergic response and the like and are commensurate with a reasonable benefit/risk ratio.

By "isomer" is meant a molecule having the same molecular formula as the reference molecule. Exemplary isomers include stereoisomers, diastereomers, enantiomers, geometric isomers, tautomers, as well as mixtures thereof.

By an "effective amount" or a "sufficient amount" of an agent (e.g., a composition, a construct, a formulation, and/or a cargo), as used herein, is that amount sufficient to effect beneficial or desired results, such as clinical results, and, as such, an "effective amount" depends upon the context in which it is being applied. For example, in the context of administering an agent that is an inhibitor of an enzyme, an effective amount of an agent is, for example, an amount sufficient to achieve a reduction in that enzyme or its activity, as compared to the response obtained without administration of the agent.

By "subject" is meant a human or non-human animal (e.g., a mammal).

By "treating" a disease, disorder, or condition in a subject is meant reducing at least one symptom of the disease, disorder, or condition by administrating a therapeutic agent to the subject. By "treating prophylactically" a disease, disorder, or condition in a subject is meant reducing the frequency of occurrence of or reducing the severity of a disease, disorder or condition by administering a therapeutic agent to the subject prior to the onset of disease symptoms. Beneficial or desired results can include, but are not limited to, alleviation or amelioration of one or more symptoms or conditions; diminishment of extent of disease, disorder, or condition; stabilized (i.e., not worsening) state of disease, disorder, or condition; preventing spread of disease, disorder, or condition; delay or slowing the progress of the disease, disorder, or condition; amelioration or palliation of the disease, disorder, or condition; and remission (whether partial or total), whether detectable or undetectable.

Other features and advantages of the invention will be apparent from the following description and the claims.

BRIEF DESCRIPTION OF THE DRAWINGS

FIG. 2 provides a scheme showing molecular structures of organophosphates used in this study: diethylchlorophosphate (DECP), dimethyl 4-nitrophenylphosphate (DMNP), diisopropyl-fluorophosphate (DFP), and Sarin (GB).

FIG. 3 provides electron microscopy images of (a) EuDOBDC (TEM); (b) UiO-66 (TEM); (c) UiO-66-DOBDC (TEM); and (d) YDOBDC (SEM).

FIG. 7A-7D provides snapshots from DFT vibrational analysis highlighting the effect of the ligand (UiO-66-DOBDC, (A) and (B)) and that of the metal (YDOBDC, EuDOBDC and UiO-66-DOBDC, (C) and (D)) for select IR modes.

DETAILED DESCRIPTION OF THE INVENTION

Figure 1A:
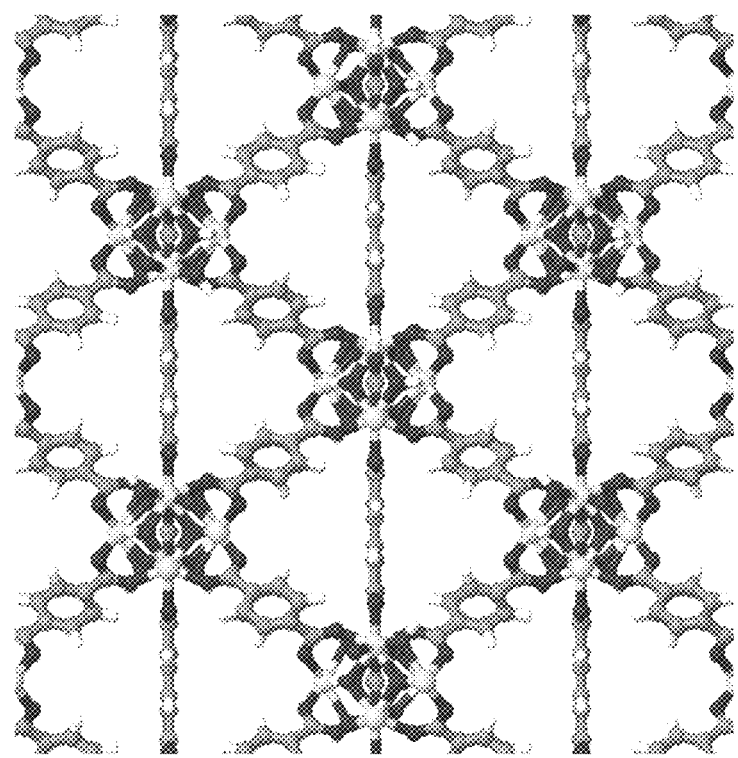
FIG. 1A-1B provides ball-and-stick representation of the periodic structures of (A) UiO-66 (atom color scheme includes Zr=light gray; C=grey; O=dark gray; and H=white) and (B) EuDOBDC materials (atom color scheme includes Eu=light gray; C=grey; O=dark gray; and H=white).
Figure 1B:
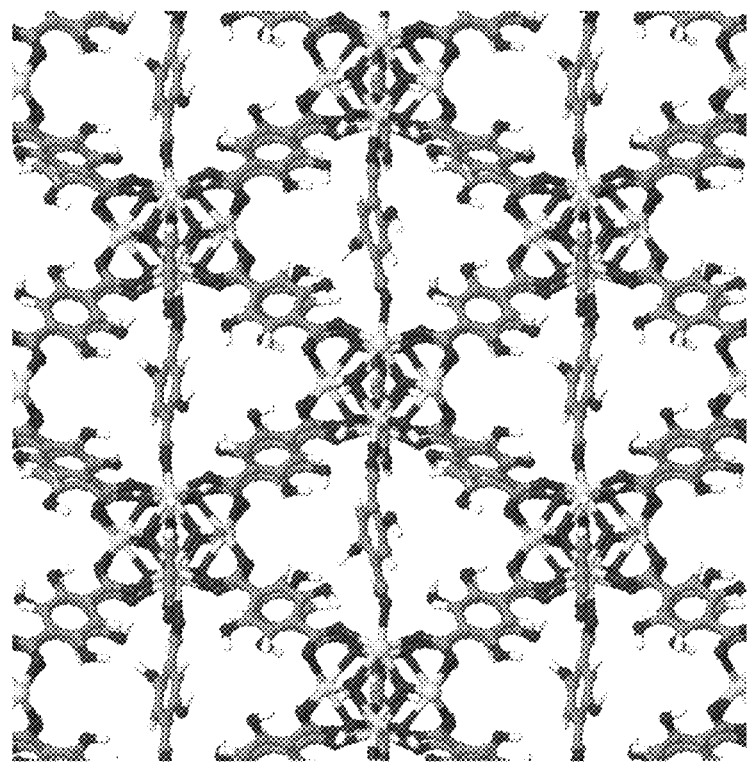

The present invention relates to composition containing a MOF composition including a plurality of metal clusters and a plurality of ligands coordinating with the plurality of metal clusters (e.g., as described herein). In particular embodiments, the MOF composition provides degradation of a chemical agent, as described herein.

Non-Aqueous Conditions

The present invention relates, in part, to reactions conducted under non-aqueous conditions. In particular, non-aqueous conditions include use of a solvent that does not include water, e.g., use of a non-aqueous solvent, as described herein. In some embodiments, minimal water may be present within the solvent, e.g., less than about 10% of water content by weight. In other embodiments, a non-aqueous solvent is a solvent having less than about 10% of water content by weight (e.g., less than about 5% by weight, 1% by weight, 0.1% by weight, or 0.01% by weight, based on the total weight of the solvent).

Exemplary non-aqueous solvents include a protic solvent (e.g., a $C_{1-6}$ alcohol (e.g., $C_{1-6}$ alkyl-OH), such as methanol, ethanol, n-propanol, isopropanol, n-butanol, isobutanol, t-butanol, pentanol, hexanol and mixtures thereof; formic acid; acetic acid; and nitromethane), an aprotic solvent (e.g., N,N-dimethylformamide (DMF), N,N-diethylformamide (DEF), N,N-dimethyl-acetamide (DMAc), dimethyl sulfoxide (DMSO), acetone, dimethoxyethane, tetrahydrofuran (THF), acetonitrile, N-methylpyrrolidone (NMP), etc.), a non-polar solvent (e.g., hexane, toluene, benzene, diethyl ether, etc.), or a mixture thereof.

Other exemplary non-aqueous solvents include an alcohol (e.g., methanol, ethanol, isopropanol, propanol, or mixtures thereof), a polyol (e.g., a diol, such as ethylene glycol, or a triol, such as glycerol), an ether (e.g., diethyl ether, diethylene glycol monoethyl ether, dioxane, etc.), or mixtures of any of these.

Yet other exemplary non-aqueous solvents include a hydrofluoroether. In one instance, the hydrofluoroether has a formula of $R^{F1}$—O—$R^{F2}$, where each of $R^{F1}$ and $R^{F2}$ is, independently, an optionally substituted alkyl, haloalkyl, perfluoroalkyl, cycloalkyl, aryl, or alkaryl, in which at least one of $R^{F1}$ and $R^{F2}$ includes fluoro. In another instance, the hydrofluoroether has a formula of $Rf(OR^{Ak})_n$, where Rf is a perfluorinated alkyl group, $R^{Ak}$ is an optionally substituted alkyl group, and n is a number from 1 to 3 (e.g., further where the number of carbon atoms contained in Rf is greater than the total number of carbon atoms contained in all $R^{Ak}$ groups. Exemplary hydrofluoroethers include methoxynonafluorobutane ($C_4F_9OCH_3$), 1,1-dimethoxyperfluoro cyclohexane, $C_7F_{15}OCH_3$, $C_5F_{11}OC_2H_5$, $C_5F_{11}OCH_3$, ethoxynonafluorobutane ($C_4F_9OCH_2CH_3$), propoxynonafluorobutane ($C_4F_9OC_3H_7$), as well as any described in International Publication No. WO 1999/019707, which is incorporated herein by reference in its entirety.

In particular embodiments, the non-aqueous solvent is selected based on the rate or half-life of solvolysis of a chemical agent. In general, solvolysis is a reaction between the solvent and a compound, thereby resulting in breaking of one or bonds within the compound. In particular embodiments, breaking of bonds result in substitution, elimination, and/or fragmentation reactions, in which the solvent molecule serves as a nucleophile. A skilled artisan would understand how to determine the rate or half-life of a solvolysis reaction. In one non-limiting instance, the rate is determined by measuring a characteristic chemical signal of a degradation product (e.g., a signal measured by nuclear magnetic resonance (NMR) spectroscopy, including $^1$H, $^2$H, $^{13}$C, $^{31}$P, $^{17}$O, $^{14}$N, $^{15}$N based NMR).

MOF Compositions

The MOF compositions herein can include any useful metal (e.g., a metal ion). The composition can include one metal or a combination of two or more different metals. In addition, the composition can include the same metal having different coordination geometries. Exemplary metals include a rare earth metal, e.g., cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y); or a transition metal, e.g., zinc (Zn), zirconium (Zr), titanium (Ti), hafnium (Hf), iridium (Ir), or copper (Cu).

Furthermore, the composition can include one or more metal clusters. Each cluster, in turn, can include a metal ion with one or more ligands. Within a cluster, if a plurality of metal ions is present within the same cluster, each metal ion can be the same or different. Between clusters, the metal ion of a first cluster can be the same or different than the metal ion of a second cluster. Each metal cluster can be the same or different. Exemplary differences can be a different element, a different coordination geometry, a different combination of ligand bridging or chelating, a different ligand, etc.

In one non-limiting embodiment, the cluster includes a plurality of metal ions, in which each metal ion is coordinated to one or more ligands (e.g., a bridging ligand, a chelating ligand, a bridging/chelating ligand). Exemplary ligands include hydroxyl (e.g., $\mu_n$-OH, in which n is 1, 2, 3, etc.), a monodentate ligand, a bidentate ligand (e.g., a bidentate bridging ligand, a bis-bidentate bridging ligand, a bidentate chelating ligand, or a bis-bidentate chelating ligand), a tridentate ligand (e.g., a tridentate bridging ligand or a tridentate chelating ligand), a tetradentate ligand (e.g., a tetradentate bridging ligand or a tetradentate chelating ligand), etc.

In some embodiments, the cluster coordinates with both a monodentate ligand and a bidentate ligand. In other embodiments, the cluster coordinates with a plurality of monodentate ligands and a plurality of bidentate ligands. The clusters and ligands can form any useful network (e.g., a periodic network, in one instance characterized by a tetragonal crystal structure).

Ligands can have any useful structure. In one non-limiting embodiment, the ligand has the structure of $(L^1)_m$-$R^L$-$(L^2)_n$, where each of $L^1$ and $L^2$ is, independently, a reactive group; where $R^L$ is a linker; and where each of m and n is, independently, 1, 2, 3, 4, 5, 6, or one of m or n is 0. For instance, if m and n are both one, then the ligand is a bivalent ligand (e.g., $L^1$-$R^L$-$L^2$). In another instance, if m is 1 and n is 2, then the ligand is a trivalent ligand (e.g., $L^1$-$R^L$-$(L^2)_2$ or $L^1$-$R^L$<$L^{2a}L^{2b}$, in which each $L^2$ is the same or different or in which $L^{2a}$ and $L^{2b}$ are the same or different).

$L^1$ and $L^2$ can be any useful reactive group, such as any useful for forming a metal bond (e.g., a coordinate bond, a covalent bond, etc.). Exemplary reactive groups can include carboxyl, heterocyclyl, amino, phosphoryl, sulfonyl, as well as anionic forms thereof (e.g., carboxylate, azolate (e.g., such as imidazolate, pyrazolate, triazolate, tetrazolate), phosphate, sulfonate, sulfate, etc.), salts thereof, or esters thereof.

The ligand can have any useful linker (e.g., $R^L$). Exemplary linkers can include an optionally substituted aryl (e.g., optionally substituted arylene), optionally substituted heteroaryl (e.g., optionally substituted heteroarylene), an optionally substituted alkyl (e.g., optionally substituted alkylene), or an optionally substituted heteroalkyl (e.g., optionally substituted heteroalkylene). Optional substitutions can include one or more of the following on a backbone (e.g., an arylene or alkylene backbone): hydroxyl, optionally substituted alkyl, haloalkyl, hydroxyalkyl, optionally substituted alkoxy (e.g., methoxy, ethoxy, benzyloxy, etc.), optionally substituted cycloalkyl, optionally substituted cycloalkoxy, optionally substituted aryl, optionally substituted aryloxy, halo, carboxyl, azido, cyano, nitro, amino, aminoalkyl, or carboxyaldehyde, as well as any optional substituents described herein for alkyl and aryl.

Exemplary linkers can include an optionally substituted phenylene, optionally substituted dithieno[3,2-b;2',3'-d]-thiophene, optionally substituted 2,2'-bipyridyl, optionally substituted terphenylene (in ortho, meta, or para forms), and an optionally substituted biphenylene.

The MOF can include any useful metal (e.g., metal atom, metal ion, or metal cluster) in combination with any useful ligand (e.g., any described herein). Further non-limiting, exemplary ligands include 3,3',5,5'-azobenzenetetracarboxylate (ADB$^{4-}$); 5,5'-(9,10-anthracenediyl)di-isophthalate (ADIP$^{4-}$); adamantane-1,3,5,7-tetracarboxylate (ATC$^{4-}$); 4,4',4"-(benzene-1,3,5-triyl-tris(benzene-4,1-diyl))tribenzoate (BBC$^{3-}$ or TCBB$^{3-}$); 1,4-benzenedicarboxylate (BDC$^{2-}$); BDC-(X)$^{2-}$ or BDC-(X)$_2^{2-}$ where each X is, independently, alkyl, halo, hydroxyl, nitro, amino, carboxyl, alkoxy, cycloalkoxy, aryloxy, benzyloxy (e.g., 2-amino-1,4-benzenedicarboxylate (BDC-NH$_2^{2-}$) or 2,5-diamino-1,4-benzenedicarboxylate (BDC-(NH$_2$)$_2^{2-}$); 5,5',5"-((((benzene-1,3,5-triyltris(benzene-4,1-diyl))tris(ethyne-2,1-diyl))-tris (benzene-4,1-diyl))tris(ethyne-2,1-diyl))triisophthalate] (BHEHPI$^{6-}$); 5,5',5"-(benzene-1,3,5-triyl-tris(buta-1,3-diyne-4,1-diyl)) triisophthalate (BHEI$^{6-}$); 5,5',5"-(((benzene-1,3,5-triyl-tris(ethyne-2,1-diyl))tris(benzene-4,1-diyl)) tris(buta-1,3-diyne-4,1-diyl))triisophthalate (BNETPI$^{6-}$); 4,4'-biphenyl dicarboxylate (BPDC$^{2-}$); 2,2'-bipyridine-5,5'-dicarboxylate (BPYDC$^{2-}$); 4,4',4"-benzene-1,3,5-triyl-tribenzoate (BTB$^{3-}$); 1,3,5-benzenetricarboxylate or 1,2,4-benzenetricarboxylate (BTC$^{3-}$); 4,4',4"-(benzene-1,3,5-triyl-tris(ethyne-2,1-diyl))tribenzoate (BTE$^{3-}$); 5,5',5"-(benzene-1,3,5-triyl-tris(ethyne-2,1-diyl))triisophthalate (BTEI$^{6-}$); 5',5"",5""""-(benzene-1,3,5-triyl-tris(ethyne-2,1-diyl))tris (([1,1':3',1"-terphenyl]-4,4"-dicarboxylate)) (BTETCA$^{3-}$); 4,4',4"-(benzene-1,3,5-triyl)tris (pyrazol-1-ide) (BTP$^{3-}$); 5,5',5"-(benzene-1,3,5-triyl-tris(benzene-4,1-diyl))triisophthalate (BTPI$^{6-}$); 5,5',5"-(benzene-1,3,5-triyl-tris(biphenyl-4,4'-diyl))triisophthalate (BTTI$^{6-}$); 3,3'-difluoro-biphenyl-4,4'-dicarboxylate (DFBPDC$^{2-}$); 2,5-dioxido-1,4-benzenedicarboxylate (DOBDC$^{4-}$); 4,6-dioxido-1,3-benzenedicarboxylate (m-DOBDC$^{4-}$); 4,4'-dioxidobiphenyl-3,3'-dicarboxylate (DOBPDC$^{4-}$); dioxidoterephthalate (DOT$^{2-}$); 4,4'-([2,2'-bipyridine]-5,5'-diyl) dibenzoate (DPBPyDC$^{2-}$); 3-fluoro-biphenyl-4,4'-dicarboxylate (FBPDC$^{2-}$); 2-fluoro-4-(1H-tetrazol-5-yl)benzoate (FTZB$^{2-}$); 3-fluoro-4'-(1H-tetrazol-5-yl)biphenyl-4-carboxylate (FTZBP$^{2-}$); imidazoledicarboxylate (HImDC$^{3-}$); 1,4-naphthalenedicarboxylate (NDC$^{2-}$); 5,5',5"-((benzene-1,3,5-triyl-tris(benzene-4,1-diyl))tris(ethyne-2,1-diyl))tri-isophthalate (PTEI$^{6-}$); 3,5-pyridinedicarboxylate or 2,5-pyridinedicarboxylate (PyDC$^{2-}$); 4,4',4"-(1,3,5-triazine-2,4,6-triyl)tribenzoate (TATB$^{3-}$); 1,3,6,8-tetrakis(p-benzoate)pyrene (TBAPy$^{4-}$); 2,4,6-trihydroxy-1,3,5-benzenetrisulfonate (THBTS$^{3-}$); tris(4-(1H-imidazol-1-yl)phenyl)amine (TIPA$^{3-}$); 5,5',5"-((benzene-1,3,5-tricarbonyl)tris(azanediyl))triisophthalate (TPBTM$^{6-}$); 5,5',5"-(((benzene-1,3,5-triyl-tris(ethyne-2,1-diyl)) tris(benzene-4,1-diyl))tris(ethyne-2,1-diyl))triisophthalate (TTEI$^{6-}$); and 4-(1H-tetrazol-5-yl)benzoate ($TZB^{2-}$); each of which may optionally include one or more counterions (e.g., one or more counteranions or countercations), as well as a cation thereof, an anion thereof, a protonated form thereof, a salt thereof, or an ester thereof.

Exemplary reagents to install a ligand include, e.g., oxalic acid; fumaric acid; adamantanetetracarboxylic acid ($H_4ATC$); adamantanetetrabenzoic acid ($H_4ATB$); 9,10-anthracenedicarboxylic acid ($H_4ADB$); acetylene dicarboxylic acid ($H_2ADC$); 1,3,5-tris(4'-carboxy[1,1'-biphenyl]-4-yl) benzene ($H_3BBC$); terephthalic acid and optionally substituted forms thereof (e.g., $H_2BDC$ or $H_2BDC$-(X) or $H_2BDC$-$(X)_2$, in which X can be optionally substituted alkyl, halo, hydroxyl, nitro, amino, carboxyl, optionally substituted alkoxy, optionally substituted cycloalkoxy, or optionally substituted aryloxy); biphenyl-3,4',5-tricarboxylic acid ($H_3BHTC$); biphenyl-3,3',5,5'-tetracarboxylic acid ($H_4BPTC$); 1,3,5-tris(4-carboxy phenyl) benzene ($H_3BTB$); trimesic acid ($H_3BTC$); 1,3,5-triscarboxyphenyl ethynyl-benzene ($H_3BTE$); 2,5-dihydroxyterephthalic acid ($H_4DOBDC$); 2,5-dihydroxy-1,4-benzenedicarboxylic acid ($H_4DOT$); glycine-alanine (Gly-Ala); imidazole (Im); methylimidazole (mIm); 3,3',5,5'-tetracarboxydiphenylmethane ($H_4MDIP$); 2-methylimidazole (HMIM); methane tetrabenzoic acid ($H_4MTB$); 2,6-naphthalenedicarboxylic acid (2,6-$H_2NDC$); 5'-(4-carboxyphenyl)-[1,1':3',1"-terphenyl]-3,3",5,5"-tetracarboxylic acid ($H_5PTPCA$); 4,4',4"-s-triazine-2,4,6-triyl-tribenzoic acid ($H_3TATB$); 1,2,4,5-tetrakis(4-carboxyphenyl)benzene ($H_4TCPB$); [1,1':4',1"]terphenyl-3,3',5,5'-tetracarboxylic acid ($H_4TPTC$), as well as optionally substituted forms of any of these (e.g., optional substitutions as provided for alkyl or aryl herein).

Exemplary MOF compositions include EuDOBDC ($Eu_6$ $(\mu_3$-$OH)_8(C_8H_4O_6)_5(C_8H_6O_6)_1(H_2O)_6 \cdot 24H_2O$ or $Eu_{12}$ $(OH)_{16}(C_8H_5O_6)_4(C_8H_4O_6)_8$); YDOBDC ($Y_{12}(OH)_{16}$ $(C_8H_5O_6)_4(C_8H_4O_6)_8$); NdDOBDC ($Nd_{12}(OH)_{16}(C_8H_5$ $O_6)_4(C_8H_4O_6)_8$); YbDOBDC ($Yb_{12}(OH)_{16}(C_8H_5O_6)_4$ $(C_8H_4O_6)_8$); TbDOBDC ($Tb_{12}(OH)_{16}(C_8H_5O_6)_4(C_8H_4$ $O_6)_8$); $Nd_{0.67}Yb_{0.33}$DOBDC (($Nd_{0.67}Yb_{0.33})_{12}(OH)_{16}$ $(C_8H_5O_6)_4(C_8H_4O_6)_8$); $Nd_{0.46}Yb_{0.54}$DOBDC (($Nd_{0.46}Yb_{0.54})_{12}(OH)_{16}(C_8H_5O_6)_4(C_8H_4O_6)_8$); UiO-66-DOBDC ($Zr_6(\mu_3$-$O)_4(\mu_3$-$OH)_4(C_8H_4O_6)_6$); UiO-66 ($Zr_6(\mu_3$-$O)_4(\mu_3$-$OH)_4(BDC)_6$ or $Zr_6(\mu_3$-$O)_4(\mu_3$-$OH)_4(C_8H_4O_4)_6$); UiO-67 ($Zr_6(\mu_3$-$O)_4(\mu_3$-$OH)_4(BPDC)_6$); NU-1000 ($Zr_6(\mu_3$-$O)_4(\mu_3$-$OH)_4(OH)_4(H_2O)_4(TBAPy)_2$); MOF-808 ($Zr_6(\mu_3$-$O)_4(\mu_3$-$OH)_4(OH)_6(H_2O)_6(BTC)_2$); and PCN-777 ($Zr_6(\mu_3$-$O)_4(\mu_3$-$OH)_4(OH)_6(H_2O)_6(CO_2)_6$ for benzene-1,4-dicarboxylate ($BDC^{2-}$), 1,3,6,8-tetrakis(p-benzoate)pyrene ($TBAPy^{4-}$), benzene-1,3,5-tricarboxylate ($BTC^{3-}$), and biphenyldicarboxylate ($BPDC^{2-}$).

The MOF composition can have any useful form. In one non-limiting instance, the MOF is provided as a particle having a diameter greater than about 10 nm (e.g., greater than about 20 nm, 30 nm, 40 nm, 50 nm, 60 nm, 70 nm, 80 nm, 90 nm, 100 nm, 125 nm, 150 nm, 200 nm, 300 nm, 500 nm, 750 nm, 1 µm, 2 µm, 5 µm, 10 µm, 20 µm, or more) or of from about 10 nm to about 100 nm (e.g., from 10 nm to 50 nm, 20 nm to 50 nm, 20 nm to 100 nm, 30 nm to 100 nm, etc.). In another non-limiting instance, the MOF is provided as a crystal having a dimension of from about 1 µm to about 60 µm. The composition can be provided as packed particles, a gel (e.g., including a plurality of particles), a crystal, a dehydrated form, etc. The MOF composition can also be provided as any useful article, such as a textile, an aerosol, a decontamination formulation, etc.

Chemical Agents and Simulants

The MOF can be employed to degrade any desired chemical agent (e.g., a chemical warfare agent or a simulant thereof). Exemplary chemical agents include an organophosphorous agent (e.g., an organophospate agent), including but not limited to tabun (GA), sarin (GB), chlorosarin, soman (GD), chlorosoman, cyclosarin (GF), diisopropylfluorophosphate (DFP), VR nerve agent (N,N-diethyl-2-(methyl-(2-methylpropoxy)phosphoryl)sulfanylethanamine or R-33), VX nerve agent (O-ethyl S-[2-(diisopropylamino) ethyl] methylphosphonothioate or Venomous Agent X), methyl paraoxon, or methyl parathion; an insecticide, including carbamates or organophosphorous or phosphorothioate agents, such as azamethiphos, azinphos-methyl, chlorpyrifos, coumaphos, cyanophos, demeton, diazinon, dichlorovos, diisopropyl fluorophosphate (DFP), dioxathion, fenitrothion, fonofos, glyphosate, malathion, methamidophos, mevinphos, oxydemeton-methyl, parathion, phosmet, tetrachlorvinphos, and tetraethylpyrophosphate (TEPP); a blister agent, including a sulfur-based mustard agent (e.g., H or HD agent (1-chloro-2-[(2-chloroethyl) sulfanyl]ethane) or bis(2-chloroethyl)sulfide), HK agent (nis-(2-chloroethylthio)-methane), Q agent (sesquimustard or 1,2-Bis-(2-chloroethylthio)-ethane), T agent (0-mustard or bis-(2-chloroethylthioethyl)-ether), or other agents (e.g., 2-chloroethyl chloromethyl sulfide, bis-1,3-(2-chloroethyl-thio)-n-propane, bis-1,4-(2-chloroethylthio)-n-butane, bis-1,5-(2-chloroethylthio)-n-pentane, or bis-(2-chloroethylthio methyl)-ether)), a nitrogen-based mustard agent (e.g., HN1 agent (bis(2-chloroethyl)ethylamine), HN2 agent (bis(2-chloroethyl)methylamine), and HN3 agent (tris(2-chloroethyl)amine), or a Lewisite-based agent (e.g., 2-chloroethenylarsonous dichloride); or a metabolite of any of these, such as chlorpyrifos oxon, diazoxon, malaoxon, or paraoxon; or a simulant of any of these, such as an organic molecule including a phosphoryl group (e.g., as defined herein) or a phosphate group (e.g., $P(O)XO_2^{2-}$, where X is halo, as defined herein; $P(O)XR^{Ak}O^-$, where X is halo and $R^{Ak}$ is optionally substituted alkyl, as defined herein; or $PO_4^{3-}$), or an exemplary substituted organophosphate compound having the formula of $P(O)(OR^1)(OR^2)(OR^3)$, $P(O)$ $(X)(OR^2)(OR^3)$, $P(O)(R^1)(OR^2)(OR^3)$, $P(O)(R^1)(X)(OR^3)$, $P(O)(R^1)(OR^2)(SR^3)$, $P(O)(X^1)(X^2)(NR^2R^3)$, $P(O)(X^1)(X^2)$ $(OR^2)$, $P(S)(OR^1)(OR^2)(OR^3)$, $P(S)(SR^1)(OR^2)(OR^3)$, $P(S)$ $(X)(OR^2)(OR^3)$, or $P(S)(X)(R^2)(OR^3)$, where each X, $X^1$, and $X^2$, is, independently, halo, hydroxyl, haloalkyl, or cyano, and where each of $R^1$, $R^2$, and $R^3$, independently, is optionally substituted alkyl (e.g., optionally substituted methyl, ethyl, propyl, or butyl), optionally substituted aryl (e.g., optionally substituted phenyl), or optionally substituted alkaryl (e.g., optionally substituted benzyl).

Further exemplary chemical agents include a trialkyl phosphate (e.g., $P(O)(OR^1)(OR^2)(OR^3)$), an alkyl dialkylphosphonate (e.g., $P(O)(R^1)(OR^2)(OR^3)$), a dialkyl alkylphosphinate (e.g., $P(O)(R^1)(R^2)(OR^3)$), where each of $R^1$, $R^2$, and $R^3$, independently, is optionally substituted alkyl (e.g., optionally substituted methyl, ethyl, propyl, or butyl), optionally substituted aryl (e.g., optionally substituted phenyl), or optionally substituted alkaryl (e.g., optionally substituted benzyl). Yet other exemplary chemical agents include a haloalkyl sulfide (e.g., $R^{Hal}$—S—$R^{Hal}$, $R^{Ak}$—S—$R^{Hal}$, or $R^{Ar}$—S—$R^{Hal}$), an alkyl sulfide (e.g., $R^{Ak}$—O—$R^{Ak}$), an aryl sulfide (e.g., $R^{Ak}$—S—$R^{Ar}$ or $R^{Ar}$—S—$R^{Ar}$), a haloalkylether (e.g., $R^{Ak}$—O—$R^{Hal}$ or $R^{Hal}$—O—$R^{Hal}$), or a haloalkyl amine (e.g., $R^{Hal}$—NH—$R^{Hal}$ or $R^{Hal}$—$NR^{Ak}$—$R^{Hal}$) where each $R^{Ak}$ is, independently, an optionally substituted alkyl; each $R^{Hal}$ is, independently, an optionally substituted haloalkyl; and each $R^{Ar}$ is, independently, an optionally substituted aryl.

Exemplary simulants include dimethyl-4-nitrophenyl phosphate (DMNP), diethyl-4-nitrophenyl phosphate (DENP), bis(4-nitrophenyl) phosphate (BNPP), 4-nitrophenyl diphenylphosphate (NPDP), diisopropyl fluorophosphonate (DFP), isopropyldodecyl fluorophosphate (IDFP), diisopropyl methylphosphonate (DIMP), dimethyl methylphosphonate (DMMP), diethyl methylphosphonate (DEMP), diethyl chlorophosphate (DECP), diethyl cyanophosphonate, dimethyl chlorophosphate (DMCP), methyl dichlorophosphate (MDCP), trimethyl phosphate (TMP), PhX (O-ethyl, S—(N,N-diisopropylethylene) phenylthiophosphonate), diethyl 3-(dimethylamino)propylphosphonate, O,S-diethyl methylthiophosphonate, O,S-diethyl phenylthiophosphonate (DEPPT), O,O-diethyl S-phenylphosphorothioate, S-phenyl diphenyl phosphinothioate, O,O-diethyl N,N-diethylphosphoramidate (DEDEPA), O,O-dicyclohexyl methylphosphonate, O-ethyl N,N-diethylphosphoramidocyanidate, phosphocholine, pinacoylmethylphosphonic acid, methyl phosphonic acid, p-aminophenyl 1,2,2-trimethylpropyl diester (MATP), VX analog (e.g., $(CH_3)P(O)(SC_2H_5)(OC_2H_5)$), 2-chloroethyl ethyl sulfide (CEES), 2-chloroethyl ethyl ether (CEEE), 2-chloroethyl phenyl sulfide, bis(chloroethyl) ether (oxygen mustard), or thioanisole.

EXAMPLES

Example 1: Degradation of Organophosphates in Water-Free Environments

Herein, we describe the degradation of organophosphates (chemical warfare agents (CWA) and simulants) in water-free environments via a catalytic process using metal-organic framework (MOF) materials. Currently, there are no efficient countermeasures for the deactivation of organophosphates in contaminated electronic equipment, such as electronics, instruments, and communication devices. These sensitive electronics are incompatible with existing water-based/corrosive decontamination technologies. As such, there is a need to discover new technologies for the decontamination of sensitive electronics without causing damage.

In particular, we describe the catalytic activity of metal-organic frameworks towards the water-free degradation of organophosphates, such as chemical warfare agents, (e.g., Sarin and Soman (nerve agents), HD (blister agent), and simulants (diethylchlorophosphate (DECP), dimethyl nitrophenylphosphate, or diisopropyl fluorophosphate as surrogate molecules for Sarin and Soman, as well as oxygen mustard, 2-chloroethyl ethyl sulfide, 2-chloroethyl phenyl sulfide as surrogate molecules for HD). Several solvent systems are currently being investigated, including, but not limited to alcohols (e.g., methanol and isopropyl alcohol), and hydrofluoroether-based organic solvents. Catalytic activity for organophosphates decomposition is primarily assessed using $^{31}P$ NMR. Special consideration is placed on identifying the most appropriate simulants that correlate best with the solvolysis of CWA. Experiments closely monitor the activity as function of identity of metal ions, organic linker (including functional groups), pore size and volume, and specific surface area. The effect of particle size, pH, and temperature on the degradation kinetics are also observed.

Preliminary results indicate that both dimethyl nitrophenylphosphate and diisopropyl fluorophosphate are appropriate simulants to mimic the solvolysis of Sarin (GB). In addition, we use complementary Density Functional Theory (DFT) molecular modeling to determine appropriate combinations of metals and linkers that provide guest access to the reactive (metal) site while also promoting metal-induced guest decomposition. Gas-phase cluster models are used to study the adsorption properties and reaction pathways for the decomposition of CWA and simulants. Lastly, we are exploring the ability to use catalytically active rare earth based MOFs (e.g., Eu) as a tunable sensing platform, upon exposure to organophosphates of interest. Additional details follow.

Example 2: Exemplary Synthesis of MOF Compositions

The following provides exemplary synthesis of MOF compositions. Modifications of these synthetic protocols may be employed to arrive at the desired compound, as would be understood by a skilled artisan. Additional protocols are provided in Sava Gallis D F et al., "Multifunctional, tunable metal—organic framework materials platform for bioimaging applications," *ACS Appl. Mater. Interfaces* 2017; 9:22268-77 and its Supporting information (16 pp.); and Sava Gallis D F et al., "Efficient MOF-based degradation of organophosphorous compounds in non-aqueous environments," *J. Mater. Chem. A* 2018; 6:3038-45 and its Supporting information (10 pp.), each of which is incorporated herein by reference in its entirety.

Synthesis of EuDOBDC: The reaction mixture containing $EuCl_3.6H_2O$ (0.0689 g, 0.087 mmol), 2,5-dihydroxyterephthalic acid (DOBDC, 0.0544 g, 0.087 mmol), 2-fluorobenzoic acid (2-FBA, 0.5760 g, 4.12 mmol), N,N'-dimethylformamide (DMF, 8 mL), $H_2O$ (2 mL), $HNO_3$ (0.6 mL, 3.5 M in DMF) was placed in a 20 mL scintillation vial and was heated to 115° C. for 60 h, at a rate of 1.5° C./minute and cooled to room temperature at a cooling rate of 1° C./minute.

Synthesis of NdDOBDC: The reaction mixture containing $Nd(NO_3)_3.6H_2O$ (0.0412 g, 0.0940 mmol), 2,5-dihydroxyterephthalic acid (DOBDC, 0.0272 g, 0.137 mmol), 2-fluorobenzoic acid (2-FBA, 0.2880 g, 2.06 mmol), N,N'-dimethylformamide (DMF, 4 mL), $H_2O$ (1 mL) was placed in a 20 mL scintillation vial and was heated to 115° C. for 60 h, at a rate of 1.5° C./minute and cooled to room temperature at a cooling rate of 1° C./minute.

Synthesis of YbDOBDC: The reaction mixture containing $Yb(NO_3)_3.5H_2O$ (0.0780 g, 0.174 mmol), 2,5-dihydroxyterephthalic acid (DOBDC, 0.0544 g, 0.275 mmol), 2-fluorobenzoic acid (2-FBA, 0.1948 g, 1.39 mmol), N,N'-dimethylformamide (DMF, 8.8 mL), $H_2O$ (2 mL), $HNO_3$ (0.4 mL, 3.5 M in DMF) was placed in a 20 mL scintillation vial and was heated to 115° C. for 60 h, at a rate of 1.5° C./minute and cooled to room temperature at a cooling rate of 1° C./minute.

Synthesis of YDOBDC: The reaction mixture containing $Y(NO_3)_3.6H_2O$ (0.1080 g, 0.311 mmol), 2,5-dihydroxyterephthalic acid (DOBDC, 0.0816 g, 0.412 mmol), 2-fluorobenzoic acid (2-FBA, 0.8640 g, 6.17 mmol), N,N'-dimethylformamide (DMF, 8 mL), $H_2O$ (2 mL), $HNO_3$ (0.6 mL, 3.5 M in DMF) was placed in a 20 mL scintillation vial and was heated to 115° C. for 60 h, at a rate of 1.5° C./minute and cooled to room temperature at a cooling rate of 1° C./minute.

Synthesis of TbDOBDC: The reaction mixture containing $Tb(NO_3)_3.5H_2O$ (0.1224 g, 0.281 mmol), 2,5-dihydroxyterephthalic acid (DOBDC, 0.0816 g, 0.412 mmol), 2-fluorobenzoic acid (2-FBA, 0.8640 g, 6.17 mmol), N,N'-dimethylformamide (DMF, 8 mL), $H_2O$ (2 mL), $HNO_3$ (0.6 mL, 3.5 M in DMF) was placed in a 20 mL scintillation vial and was heated to 115° C. for 60 h, at a rate of 1.5° C./minute and cooled to room temperature at a cooling rate of 1° C./minute.

Synthesis of $Nd_{0.67}Yb_{0.33}DOBDC$: The reaction mixture containing $Nd(NO_3)_3 \cdot 6H_2O$ (0.0381 g, 0.087 mmol), $Yb(NO_3)_3 \cdot 5H_2O$ (0.0391 g, 0.087 mmol), 2,5-dihydroxyterephthalic acid (DOBDC, 0.0544 g, 0.275 mmol), 2-fluorobenzoic acid (2-FBA, 0.1948 g, 1.39 mmol), N,N'-dimethylformamide (DMF, 8.8 mL), $H_2O$ (2 mL), $HNO_3$ (0.4 mL, 3.5 M in DMF) was placed in a 20 mL scintillation vial and was heated to 115° C. for 60 h, at a rate of 1.5° C./minute and cooled to room temperature at a cooling rate of 1° C./minute.

Synthesis of $Nd_{0.46}Yb_{0.54}DOBDC$: The reaction mixture containing $Nd(NO_3)_3 \cdot 6H_2O$ (0.0191 g, 0.0435 mmol), $Yb(NO_3)_3 \cdot 5H_2O$ (0.0588 g, 0.131 mmol), 2,5-dihydroxyterephthalic acid (DOBDC, 0.0544 g, 0.275 mmol), 2-fluorobenzoic acid (2-FBA, 0.1948 g, 1.39 mmol), N,N'-dimethylformamide (DMF, 8.8 mL), $H_2O$ (2 mL), $HNO_3$ (0.4 mL, 3.5 M) was placed in a 20 mL scintillation vial and was heated to 115° C. for 60 h, at a rate of 1.5° C./minute and cooled to room temperature at a cooling rate of 1° C./minute.

Synthesis of EuDOBDC-NP (nanoparticles): The reaction mixture containing $EuCl_3 \cdot 6H_2O$ (0.03445 g, 0.094 mmol), 2,5-dihydroxyterephthalic acid (DOBDC, 0.02720 g, 0.1375 mmol), 2-fluorobenzoic acid (2-FBA, 0.2880 g, 2.055 mmol), N,N'-dimethylformamide (DMF, 4 mL) was placed in a 10 mL microwave vial and was heated to 175° C. for 15 minutes. A CEM Discover SP microwave was used for this experiment.

Example 3: Efficient MOF-Based Degradation of Organophosphates in Non-Aqueous Environments Decontamination of sensitive electronics exposed to chemical contaminants such as chemical warfare agents (CWAs) is generally incompatible with existing water-based/corrosive methods. The development of new chemistries to tackle this challenge is of great interest. Here, we investigate the effectiveness of metal-organic frameworks (MOFs) to degrade organophosphates in non-aqueous environments, via a combined experimental-molecular modeling study. Emphasis is placed on understanding the effect of framework characteristics (metal identity and linker functional group) on the methanolysis of these toxic chemicals (e.g., organophosphates), along with identifying reactivity trends for relevant sarin (GB) simulants.

Several representative materials based on a hexanuclear metal cluster were judiciously selected, including the well-known catalytically active MOF, UiO-66. Complementary insights into the vibrational and structural properties of these materials were provided by periodic density functional theory (DFT) calculations. Initial findings indicate that Zr is a more effective metal center to support the degradation of organophosphates in methanol, as compared to Eu and Y. Detailed investigation into the reactivity of three relevant simulant candidates (diethyl chlorophosphate, DECP; dimethyl 4-nitrophenylphosphate, DMNP; and diisopropyl fluorophosphate, DFP) revealed that nitro- and fluorophophates are better surrogates to mimic the reactivity of GB in methanol, as compared to chlorophosphate-based molecules. Importantly, experimental results on the MOF based degradation of GB in methanol are reported here for the first time. Additionally, this is the first study that systematically investigates the effectiveness of using MOFs for the solvolysis of organophosphates, providing valuable insights for materials design and simulants downselection.

Recent world events have renewed the interest, from both a scientific and societal standpoint, for modern technologies that can efficiently degrade chemical warfare agents (see, e.g., Kaiser J, "U.N. experts find convincing evidence of large-scale sarin attack in Syria," Sep. 16, 2013, accessible at sciencemag.org/news/2013/09/un-experts-find-convincing-evidence-large-scale-sarin-attack-syria (8 pp.)). While much of the research efforts to date have focused on hydrolysis-based applications (see, e.g., Jang Y J et al., "Update 1 of: Destruction and detection of chemical warfare agents," Chem. Rev. 2015; 115:PR1-PR76), there is a need to develop materials that can decontaminate CWAs in non-aqueous environments. Currently, there are no efficient methods for the damage-free degradation of CWAs in contaminated sensitive electronics, which are incompatible with existing water-based/corrosive decontamination technologies.

Metal-organic frameworks (MOFs) are porous materials constructed from metal nodes (single or polynuclear) and organic linkers and have been extensively developed in the past decade for a variety of applications (see, e.g., Furukawa H et al., "The chemistry and applications of metal-organic frameworks," Science 2013; 341:1230444 (12 pp.)). Owing to their highly tunable, modular structures, and their stability in organic solvents, metal-organic MOFs materials are unique candidates to address this technology gap via rational materials design.

The feasibility to use MOFs as efficient catalysts for the hydrolysis of CWAs has been thoroughly investigated in the past few years (see, e.g., DeCoste J B et al., "Metal-organic frameworks for air purification of toxic chemicals," Chem. Rev. 2014; 114:5695-727; Bobbitt N S et al., "Metal-organic frameworks for the removal of toxic industrial chemicals and chemical warfare agents," Chem. Soc. Rev. 2017; 46:3357-85; Mondloch J E et al., "Destruction of chemical warfare agents using metal-organic frameworks," Nat. Mater. 2015; 14:512-6; Peterson G W et al., "Tailoring the pore size and functionality of UiO-type metal-organic frameworks for optimal nerve agent destruction," Inorg. Chem. 2015; 54:9684-6; Moon S Y et al., "Effective, facile, and selective hydrolysis of the chemical warfare agent VX using $Zr_6$-based metal-organic frameworks," Inorg. Chem. 2015; 54:10829-33; Lopez-Maya E et al., "Textile/metal-organic-framework composites as self-detoxifying filters for chemical-warfare agents," Angew. Chem. Int. Ed. 2015; 54:6790-4; Gil-San-Millan R et al., "Chemical warfare agents detoxification properties of zirconium metal-organic frameworks by synergistic incorporation of nucleophilic and basic sites," ACS Appl. Mater. Interfaces 2017; 9:23967-73; and Wang G et al., "Mechanism and kinetics for reaction of the chemical warfare agent simulant, DMMP (g), with zirconium(IV) MOFs: an ultrahigh-vacuum and DFT study," J. Phys. Chem. C 2017; 121:11261-72).

However, to our knowledge, only one study has looked into the MOF-based methanolysis of organophosphates (see, e.g., Katz M J et al., "Simple and compelling biomimetic metal-organic framework catalyst for the degradation of nerve agent simulants," Angew. Chem. Int. Ed. 2014; 53:497-501). In parallel, many studies focus on effectively incorporating MOFs into more useful scaffolds to afford ease of deployment (see, e.g., Lee D T et al., "Catalytic "MOF-Cloth" formed via directed supramolecular assembly of $UiO-66-NH_2$ crystals on atomic layer deposition-coated textiles for rapid degradation of chemical warfare agent simulants," Chem. Mater. 2017; 29:4894-903; Lopez-Maya E et al., Angew. Chem. Int. Ed. 2015; 54:6790-4; Zhao J et al., "Ultra-fast degradation of chemical warfare agents using MOF-nanofiber kebabs," *Angew. Chem. Int. Ed.* 2016; 55:13224-8; and Lu A X et al., "MOFabric: electrospun nanofiber mats from PVDF/UiO-66-NH$_2$ for chemical protection and decontamination," *ACS Appl. Mater. Interfaces* 2017; 9:13632-6).

A particularly well-studied class of MOFs are hexanuclear Zr-based MOFs in which the metal clusters are connected using bidentate carboxylate linkers (see, e.g., Bai Y et al., "Zr-based metal-organic frameworks: design, synthesis, structure, and applications," *Chem. Soc. Rev.* 2016; 45:2327-67). UiO-66 (see, e.g., Cavka J H et al., "A new zirconium inorganic building brick forming metal organic frameworks with exceptional stability," *J. Am. Chem. Soc.* 2008; 130: 13850-1) is the prototypical example in these series and has been studied widely.

To date, no experimental work has assessed the decontamination of sarin (GB) on UiO-66. Quantum chemical calculations by Troya (see, e.g., Troya D, "Reaction mechanism of nerve-agent decomposition with Zr-based metal organic frameworks," *J. Phys. Chem. C* 2016; 120:29312-23) indicate that a barrier-less process exists for the decontamination of GB on $Zr_6$-based clusters, which suggests that UiO-66 might be an attractive candidate for this application.

Here, we present a systematic study that interrogates the effectiveness of using MOFs for the solvolysis of organophosphates, focusing on: (i) understanding the role played by the framework components (metal identity and linker functional groups) in the degradation process; and (ii) identifying the most appropriate simulant that mimics the reactivity of GB in methanol.

First, to assess the metal reactivity, we judiciously selected a multifunctional isostructural MOF materials platform we recently developed (see, e.g., Sava Gallis D F et al., "Multifunctional, tunable metal-organic framework materials platform for bioimaging applications," *ACS Appl. Mater. Interfaces* 2017; 9:22268-77). The materials are constructed from rare earth (RE) metal ions (RE=Y, Nd, Eu, Tb, and Yb) and 2,5-dihydroxyterephthalic acid (DOBDC) linkers.

The structure of these materials is related to that of UiO-66, as they are based on a hexanuclear cluster core and a functionalized terephthalate organic linker. There are subtle differences in the ligand binding mode (mono- vs. bidentate), which can accommodate the higher coordination numbers in the RE-based analogues. This results in a slightly different packing and crystal system (tetragonal vs. cubic) (FIG. 1A-1B). Notably, $La^{3+}$ complexes have been previously shown to promote the catalysis of phosphate esters via solvolysis, demonstrated both in solution (see, e.g., Tsang J S et al., "Billion-fold acceleration of methanolysis of paraoxon promoted by $La(OTf)_3$ in methanol," *J. Am. Chem. Soc.* 2003; 125:7602-7; Melnychuk S A et al., "Catalytic decomposition of simulants for chemical warfare V agents: highly efficient catalysis of the methanolysis of phosphonothioate esters," *Angew. Chem. Int. Ed.* 2006; 45:1767-70; and Totten R K et al., "Catalytic solvolytic and hydrolytic degradation of toxic metal paraoxon with La(catecholate)-functionalized porous organic polymers," *ACS Catal.* 2013; 3:1454-9) and on surfaces (see, e.g., Blinov V et al., "Decontamination of paraoxon and parathion on sensitive equipment materials by catalytic methanolysis," *Ind. Eng. Chem. Res.* 2014; 53:13856-61).

Alongside selected RE-DOBDC materials from this series (Y and Eu), the reactivity of UiO-66 and its DOBDC analogue (UiO-66-DOBDC) are examined here to further probe the combined effect of metal and linker functionalization.

Concomitantly, the relevance of several simulants to mimic the reactivity of GB in methanol is investigated. CWAs are highly toxic; tests involving these compounds are not trivial and conducted only at authorized facilities. While simulants allow for materials screening, their reactivity varies greatly despite related chemical molecular structure, and may not accurately correlate to the CWA agent destruction.

Three organophosphate simulants were used in this study: diethyl chlorophosphate (DECP), dimethyl 4-nitrophenylphosphate, (DMNP), and diisopropyl fluorophosphate (DFP) (FIG. 2).

In order to develop a comprehensive understanding of the correlation between structure (framework components, chemical structure of contaminant molecule) and function (efficient solvolysis of organophosphates), we undertook a combined experimental-molecular modeling approach. A variety of tools were used for materials characterization including powder X-ray diffraction, electron microscopy, gas adsorption, and infrared spectroscopy. The catalytic activity was monitored exclusively via $^{31}P$ high resolution nuclear magnetic resonance (NMR) spectroscopy. Complementary insights into the vibrational and structural properties were provided by periodic density functional theory (DFT) quantum calculations. Additionally, reactivity trends were identified to help facilitate guiding principles for materials design and simulant down selection. Additional details follow.

Example 4: Exemplary Experimental Methods

Materials: All materials were purchased from commercially available sources and used without further purification. To be noted, the nerve agent and simulants used in this study are generically referred herein as organophosphorus compounds, to better represent both classes of compounds, organophosphates and organophosphonates.

Materials synthesis: The YDOBDC, EuDOBDC, and UiO-66 materials were synthesized according to previous reports (see, e.g., Sava Gallis D F et al., *ACS Appl. Mater. Interfaces* 2017; 9:22268-77). UiO-66-DOBDC was synthesized via a unique method.

Synthesis of UiO-66-DOBDC: A reaction mixture containing $ZrOCl_2.8H_2O$ (0.0196 g, 0.0608 mmol), 2,5 dihydroxyterephthalic acid (DOBDC, 0.025 g, 0.126 mmol), 2-fluorobenzoic acid (2-FBA, 0.257 g, 1.83 mmol), N,N'-dimethylformamide (DMF, 2.15 mL), $H_2O$ (1 mL), and $HNO_3$ (0.2 mL, 3.5 M in DMF) was placed in a 20 mL scintillation vial and was heated to 115° C. for 60 h, at a rate of 1.5° C./min and cooled to room temperature at a cooling rate of 1° C./min. A gel precipitate formed.

Infrared (IR) spectroscopy: IR spectra were collected on a Thermo Scientific Nicole iS10 FTIR spectrometer, in the range of 4000 $cm^{-1}$ to 400 $cm^{-1}$, with a total of 62 scans, data spacing of 0.24 $cm^{-1}$, and automatic atmospheric suppression.

Powder X-ray diffraction (PXRD): Measurements were collected over the 2θ range of 5° to 30° and a step size of 0.02° in 2θ on a Bruker D2 Phaser diffractometer, CuKα radiation (λ=1.54178 Å).

Sample activation and gas adsorption measurements: Prior to measuring the gas adsorption isotherms, all samples were soaked in 15 mL of methanol for 3 days, with the solvent replenished every 24 h. Following this treatment, all samples were activated under vacuum on a Micromeritics ASAP 2020 surface area and porosity analyzer at 120° C. for 16 h. Nitrogen gas adsorption isotherms were measured at 77 K using ultra-high purity nitrogen (99.999%, obtained from Matheson Tri-Gas).

$^{31}$P nuclear magnetic resonance (NMR) measurements: The diethyl chlorophosphate (DECP), dimethyl 4-nitrophenyl phosphate (DMNP), and diisopropyl fluorophosphate (DFP) simulants were used as received from Sigma-Aldrich with no further purification steps performed.

In a representative in situ NMR experiment, the MOF material was added to 1 mL of MeOH in an NMR tube. To improve the MOF dispersion into the solvent, the sample was vortexed for 30 s, followed by sonication for 1 min, and then vortexed again for 30 s. Five µL of simulant was added to the mixture, the tube was capped and shaken vigorously twice and then was immediately placed in the instrument, tuned, and the run started. The amount of MOF added was determined using a ratio of 6 mol % MOF to 5 µL of simulant: EuDOBDC (DECP: 4.84 mg), YDOBDC (DECP: 4.04 mg), UiO-66 (DECP: 3.38 mg, DMNP: 2.36 mg, DFP: 3.48 mg), and UiO-66-DOBDC (DECP: 2.85 mg, DMNP: 4.21 mg).

$^{31}$P NMR experiments were performed on a Bruker Avance III 500 instrument using a 5 mm broadband probe, with a $^{31}$P observed frequency of 202.47 MHz. Experiments were performed in an unlock mode on all reaction mixtures at a stabilized temperature of 25° C. unless labeled otherwise. The $^{31}$P NMR experiments were obtained with standard single pulse Bloch decay with inverse gated $^1$H decoupling pulse sequence (Bruker program zgig) using a spectral width of 100 ppm, recycle delay of 30 s, and 16 scan averages. Integration was performed in the Bruker Biospin TOPSPIN software suite, and used a normalized total $^{31}$P signal for analysis. The $^{31}$P NMR chemical shifts were referenced to the external 85% $H_3PO_4$ standard $\delta$=0.0 ppm.

Reaction kinetics were calculated on the assumption of a pseudo-first order rate reaction. The observed rate ($k_{obs}$) was found by plotting the natural log of the conversion product for each of the organophosphates studied versus time ln (1−product)=−$k_{obs}$·t. The half-life ($t_{1/2}$) was then calculated $t_{1/2}$=ln 2/$k_{obs}$.

Sarin (GB). Caution should be taken on any tests involving GB. The experiments should be run by trained personnel using appropriate safety procedures. The UiO-66 sample (2.5 mg) was dispersed into a 5 mm NMR tube containing MeOH (0.75 mL), followed by the addition of sarin (GB, 3.2 µL). The NMR tube was capped and shaken vigorously before being placed into the NMR magnet for monitoring by $^{31}$P NMR spectroscopy on a Varian INOVA 400 MHz NMR spectrometer. The temperature was maintained by a temperature controlled probe, and the $^{31}$P NMR chemical shifts were referenced to the external standard phosphoric acid $\delta$=0.0 ppm.

Scanning electron microscopy (SEM): SEM analyses were captured on a FEI NovaNano SEM 230, at various accelerating voltages between 1 and 20 kV.

Transmission electron microscopy (TEM): TEM images were taken on a JEOL 1200EX transmission electron microscope with a maximum acceleration voltage of 120 kV. Prior to TEM measurements, samples were dispersed in absolute ethanol and deposited on a carbon film coated copper grid.

Molecular modeling methods of periodic structures: Initial structures for Eu-DOBDC were obtained from the experimentally determined crystal structure (see, e.g., Sava Gallis D F et al., *ACS Appl. Mater. Interfaces* 2017; 9:22268-77). The model system for Y-DOBDC, for which a crystal structure is unavailable, was created in Materials Studio v.8 (BIOVIA) using the Eu-DOBDC crystal structure and changing the identity of the metal atoms. Bound waters from the crystal structure were removed during optimization and the subsequent vibrational analysis. The chemical formula of the dehydrated crystal structure was $M_{12}(OH)_{16}(C_8H_{15}O_6)_4(C_8H_4O_6)_8$ where M=Eu or Y. The model for UiO-66 was obtained from the previously determined experimental crystal structure (see, e.g., Cavka J H et al., *J. Am. Chem. Soc.* 2008; 130:13850-1), and UiO-66-DOBDC was prepared in Materials Studio by manually adding hydroxyl groups to the ligands in the UiO-66 structure. The primitive hydrated unit cell was used with a unit cell chemical formula of $Zr_6O_4(OH)_4(C_8H_4O_4)_6$ and $Zr_6O_4(OH)_4(C_8H_4O_6)_6$ for UiO-66 and UiO-66-DOBDC, respectively.

All periodic and vibrational calculations were performed using the Vienna Ab Initio Simulation Package (VASP) (see, e.g., Kresse G et al., "Ab initio molecular dynamics for liquid metals," *Phys. Rev. B.* 1993; 47:558-61; Kresse G et al., "Ab initio molecular-dynamics simulation of the liquid-metal—amorphous-semiconductor transition in germanium," *Phys. Rev. B* 1994; 49:14251-69; Kresse G et al., "Efficiency of ab-initio total energy calculations for metals and semiconductors using a plane-wave basis set," *Comput. Mater. Sci.* 1996; 6:15-50; and Kresse G et al., "Efficient iterative schemes for ab initio total-energy calculations using a plane-wave basis set," *Phys. Rev. B* 1996; 54:11169-86). The projector augmented waves (PAW) approach (see, e.g., Blöchl PE, "Projector augmented-wave method," *Phys. Rev. B* 1994; 50:17953-79; and Kresse G et al., "From ultrasoft pseudopotentials to the projector augmented-wave method," *Phys. Rev. B* 1999; 59:1758-75) was used with the Perdew-Burke-Ernzerhof revised for solids (PBEsol) exchange correlation functional (see, e.g., Perdew J P et al., "Restoring the density-gradient expansion for exchange in solids and surfaces," *Phys. Rev. Lett.* 2008; 100:136406 (4 pp.)). van der Waals interactions were included via the DFT-D3 method with Becke-Johnson damping (see, e.g., Grimme S et al., "A consistent and accurate ab initio parametrization of density functional dispersion correction (DFT-D) for the 94 elements H—Pu," *J. Chem. Phys.* 2010; 132:154104 (19 pp.); and Grimme S et al., "Effect of the damping function in dispersion corrected density functional theory," *J. Comput. Chem.* 2011; 32:1456-65). A single $\Gamma$ point in the Brillouin-zone was used in all calculations. Optimizations occurred via a three-step process in which ions were optimized first followed by a cell parameter optimization and finally a re-optimization of the ions. Ion optimizations used a cut-off energy of 400 eV, whereas the cell parameter optimization used a 520 eV cut-off.

Vibrational frequencies were calculated from the diagonalization of the Hessian matrix calculated using density functional perturbation theory (DFPT) (see, e.g., Giannozzi P et al., "Ab initio calculation of phonon dispersions in semiconductors," *Phys. Rev. B* 1991; 43:7231-42; Giannozzi P et al., "Vibrational and dielectric properties of $C_{60}$ from density-functional perturbation theory," *J. Chem. Phys.* 1994; 100:8537-9; Baroni S et al., "Phonons and related crystal properties from density-functional perturbation theory," *Rev. Mod. Phys.* 2001; 73:515-62; and Karhanek D et al., "A density-functional study of the adsorption of methane-thiol on the (111) surfaces of the Ni-group metals: II. vibrational spectroscopy," *J. Phys. Condens. Matter* 2010; 22:265006 (9 pp.)). Intensities within the DFPT method are calculated via the following equation:

$$I(\omega) = \sum_{\alpha=1}^{3} \left| \sum_{s=1}^{M} \sum_{\beta=1}^{3} Z^*_{\alpha\beta}(s) e_\beta(s) \right|^2, \tag{1}$$

where α, β are Cartesian polarizations, $Z_{\alpha\beta}^*$ (s) is the Born effective charge of atom 's', and $e_\beta(s)$ is the vibrational eigenvector of $\omega^{th}$ mode. Broadening effects were simulated by applying a Lorentzian line shape for each frequency. A full width at half max of 40 cm$^{-1}$ was used which gave the best agreement between the experimental and simulated spectra.

Molecular dynamics: The UiO-66 and isostructural UiO-66-DOBDC were filled with methanol using the Sorption module in Materials Studio. For each model, there were 1×1×1 unit cells used. Fully filled structures consisted of 64 and 38 methanol molecules respectively. Initial constant-volume molecular dynamics (MD) runs of fully filled structures indicated that diffusion of methanol would be quite slow. In an effort to reduce the diffusion timescales, all methanol molecules were removed except four molecules in a small cage. These partially filled structures were then simulated using the Forcite module of Materials Studio for 10 ns with a 1 fs timestep. All potential energy expressions were described using parameters from the UFF4MOF force-field (see, e.g., Addicoat M A et al., "Extension of the universal force field to metal-organic frameworks," *J. Chem. Theory Comput.* 2014; 10:880-91) and atomic charges from the Charge Equilibration method (see, e.g., Rappe A K et al., "Charge equilibrium for molecular dynamics simulations," *J. Phys. Chem.* 1991; 95:3358-63), however framework atoms were held fixed at their DFT-optimized positions. The temperature was maintained at 298 K using a Nosé-Hoover thermostat (see, e.g., Frenkel D and Smit B, "Understanding molecular simulation: from algorithms to applications," Academic Press (San Diego, Calif., 2002), 638 pp.). A 10 Å cutoff was used for the short-range interactions, and Ewald summation (see, e.g., Frenkel D and Smit B, "Understanding molecular simulation: from algorithms to applications," Academic Press (San Diego, Calif., 2002), 638 pp.) was used for the long range interactions.

Example 5: Structural Characterization and DFT Molecular Modeling

Figures 2, 3:
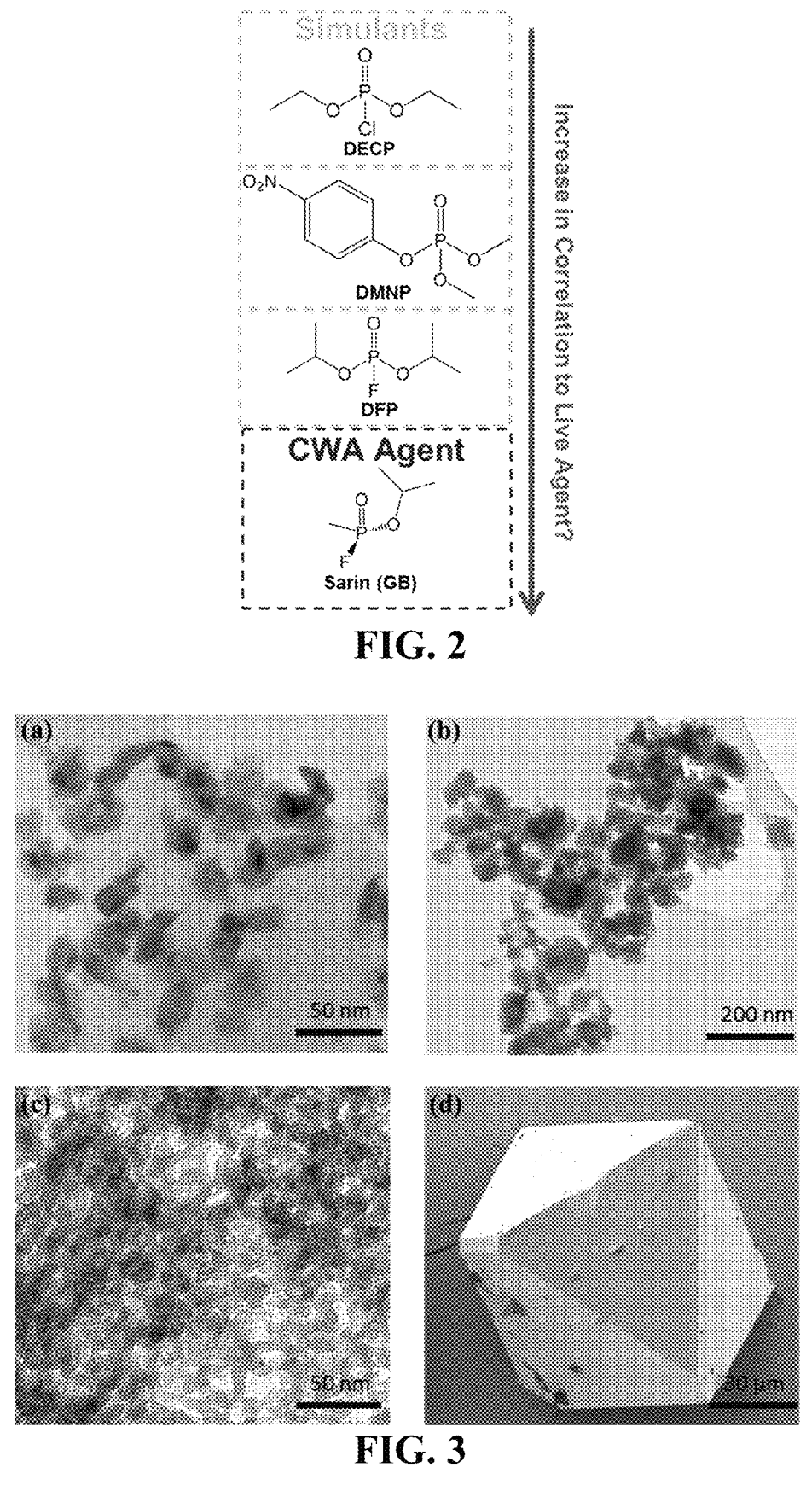

The phase purity of the EuDOBDC, YDOBDC, UiO-66, and UiO-66-DOBDC materials was confirmed by the good correlation between the experimental and calculated powder X-ray diffraction patterns (FIG. 4A-4D). Particle size and morphology were characterized by electron microscopy techniques (TEM and SEM) (FIG. 3). The Y sample was synthesized as micron sized crystals, while UiO-66 and EuDOBDC have particle dimensions smaller than 100 nm. The UiO-66-DOBDC sample was synthesized as a gel, with very small particle sizes (10-20 nm, FIG. 3C).

Figure 5:
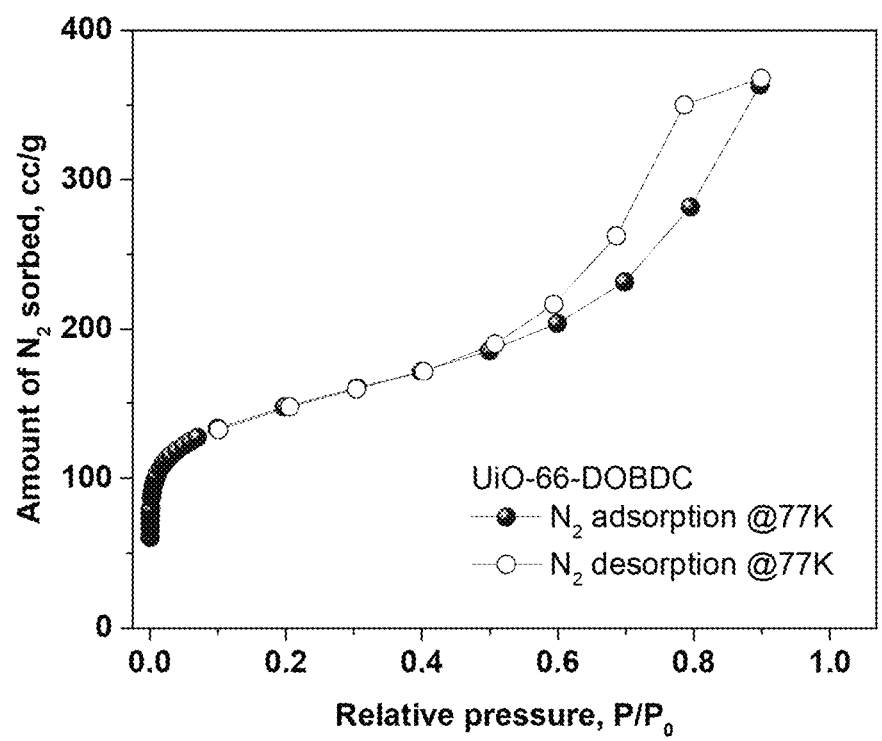
FIG. 5 provides a nitrogen sorption isotherm measured at 77K on the UiO-66-DOBDC sample.

Specific surface area was calculated from $N_2$ adsorption isotherms, measured at 77 K. UiO-66 has the highest available surface area of 1667 m$^2$/g, followed by YDOBDC=710 m$^2$/g, EuDOBDC=700 m$^2$/g, and UiO-66-DOBDC=550 m$^2$/g. To be noted, the UiO-66-DOBDC derivative displays a type IV adsorption isotherm, characteristic of mesoporous materials (FIG. 5). This has been previously observed in gel-based Zr MOFs (see, e.g., Bueken B et al., "Gel-based morphological design of zirconium metal-organic frameworks," *Chem. Sci.* 2017; 8:3939-48), and it can be attributed to a combination of both micropores and interparticle porosity in the mesoporous regime. For the RE-DOBDC materials, these results are on par with previous studies (see, e.g., Sava Gallis D F et al., *ACS Appl. Mater. Interfaces* 2017; 9:22268-77). In the case of UiO-66 and its DOBDC analogue, the surface area is known to vary greatly, depending on the synthesis methods, especially depending on the modulator used and the presence of structural defects (see, e.g., Bai Y et al., *Chem. Soc. Rev.* 2016; 45:2327-67).

TABLE 1

Optimized cell parameters for UiO-66, UiO-66-DOBDC, Y-DOBDC, and Eu-DOBDC with corresponding experimental values

| System | a (Å) | b | c | α (°) | β | γ |
|---|---|---|---|---|---|---|
| UiO-66 (sim) | 14.679 | 14.679 | 14.679 | 60.000 | 60.000 | 59.948 |
| UiO-66 (exp$^a$) | 14.668 | 14.668 | 14.668 | 60.000 | 60.000 | 60.000 |
| UiO-66-DOBDC | 14.698 | 14.698 | 14.698 | 60.000 | 60.000 | 59.864 |
| YDOBDC | 15.464 | 15.529 | 21.096 | 89.952 | 89.987 | 89.990 |
| EuDOBDC (sim) | 15.575 | 15.631 | 21.330 | 89.988 | 89.959 | 90.002 |
| EuDOBDC (exp$^b$) | 15.560 | 15.560 | 21.330 | 90.000 | 90.000 | 90.000 |

$^a$Valenzano L et al., Chem. Mater. 2011; 23:1700-18.
$^b$Sava Gallis DF et al., ACS Appl. Mater. Interfaces 2017; 9:22268-77.

Figure 6:
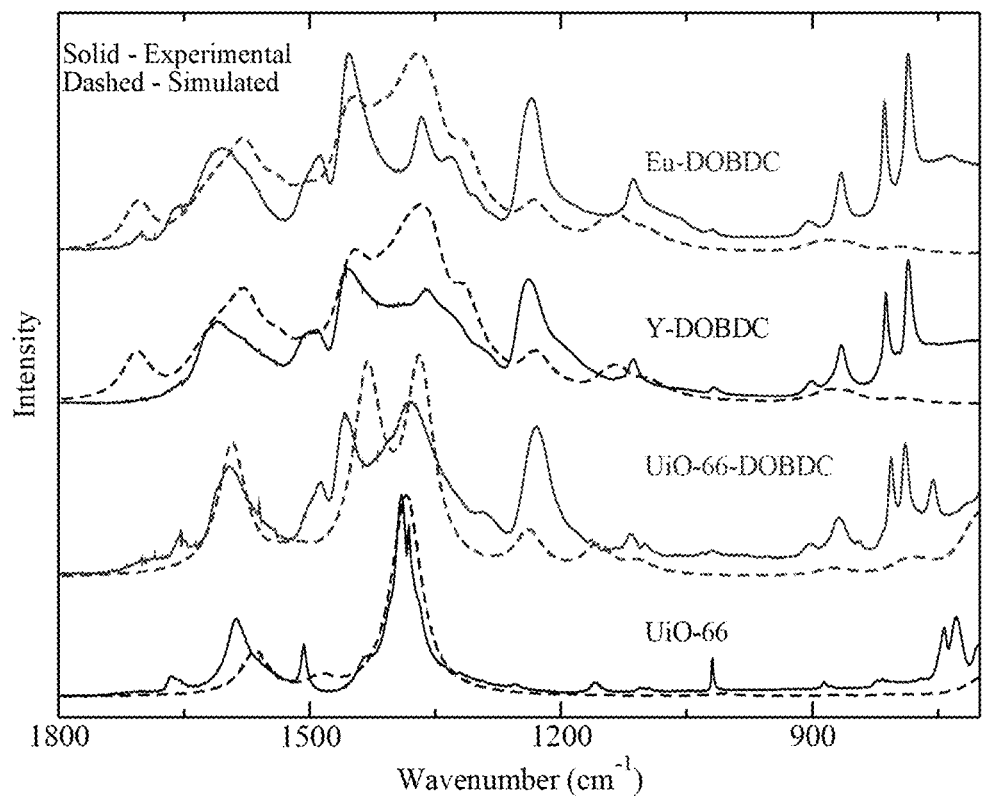
FIG. 6 provides a comparison of the experimental (solid) and simulated (dashed) IR spectra of UiO-66, UiO-66-DOBDC, YDOBDC, and EuDOBDC (from bottom to top). Intensities are shifted vertically in the interest of clarity.

Additional insights into the structural and vibration properties of these materials were provided by DFT calculations. First, all structures were optimized using the procedure described above. Optimized cell parameters are given in Table 1 and exhibit less than 0.1 Å differences from experimental values. The calculated IR spectra for all materials are in excellent agreement with the experimental FTIR spectra (FIG. 6).

TABLE 2

Selected modes and frequencies (cm$^{-1}$) from simulated vibrational spectrum for UiO-66, UiO-66-DOBDC, YDOBDC, and EuDOBDC

| UiO-66 | UiO-66-DOBDC | YDOBDC | EuDOBDC | Description |
|---|---|---|---|---|
|  |  | 1706 | 1705 | C=O stretch + $C_{carboxylate}$ —O—H bend |
|  |  | 1590 | 1589 | C=O stretch in carboxylate + C=C stretch + C—O—H bend |
| 1565 | 1575 |  |  | C=O stretch in carboxylate |
| 1484 |  |  |  | C—C stretch at carboxylate + H—C=C—H rocking |
|  | 1430 | 1440 | 1441 | C=C stretch + H—C=C—O—H rocking/scissoring |
| 1417 |  |  |  | C—C stretch at carboxylate |
| 1400 |  |  |  | C=C stretch + H—C=C—H rocking/scissoring |
| 1380 |  |  |  | C—C stretch + H—C=C—H rocking/scissoring |
|  | 1370 | 1367 | 1365 | C—C stretch at carboxylate + C=C stretch + H—C=C—O—H rocking/scissoring |

TABLE 2-continued

Selected modes and frequencies (cm$^{-1}$) from simulated vibrational spectrum for UiO-66, UiO-66-DOBDC, YDOBDC, and EuDOBDC

| UiO-66 | UiO-66-DOBDC | YDOBDC | EuDOBDC | Description |
|---|---|---|---|---|
| 1366 | | | | C—C stretch at carboxylate + H—C=C—H rocking/scissoring |
| | | 1315 | 315 | C—C stretch at carboxylate + C—O—H bend at monodentate linker |
| 1255 | | | | H—C=C—H rocking |
| | 1239 | 1231 | 120 | H—C=C—O—H rocking |
| | 1155 | 1136 | 1135 | H—C=C—O—H scissoring |

Figure 4A:
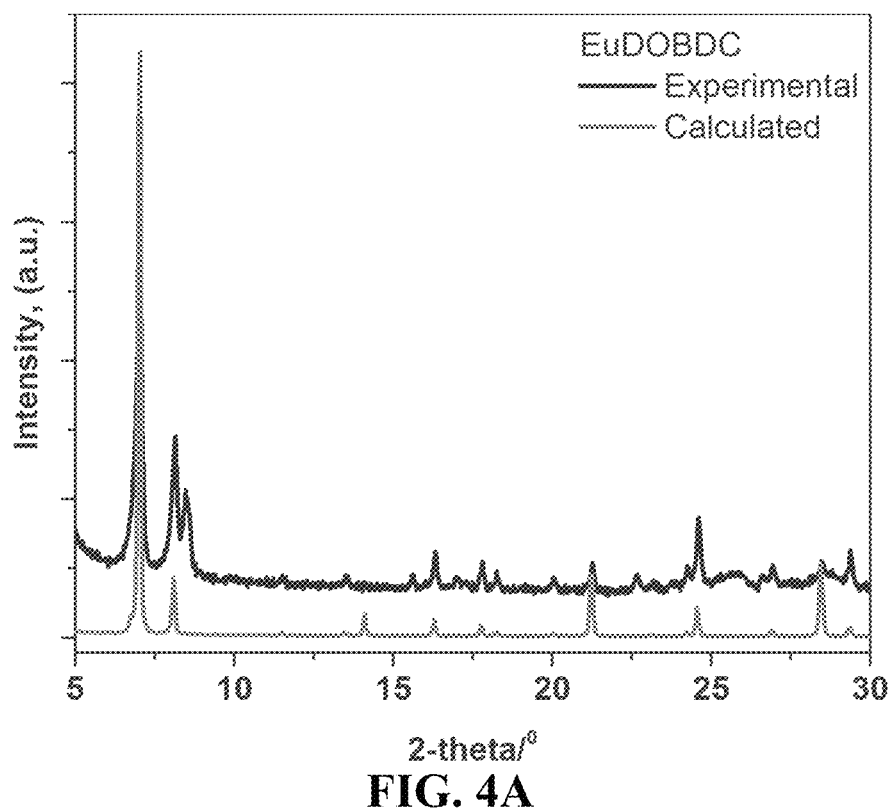
FIG. 4A-4D provides experimental (black trace) versus calculated (gray trace) powder X-ray diffraction patterns for (A) EuDOBDC, (B) YDOBDC, (C) UiO-66, and (D) UiO-66-DOBDC materials.
Figure 4B:
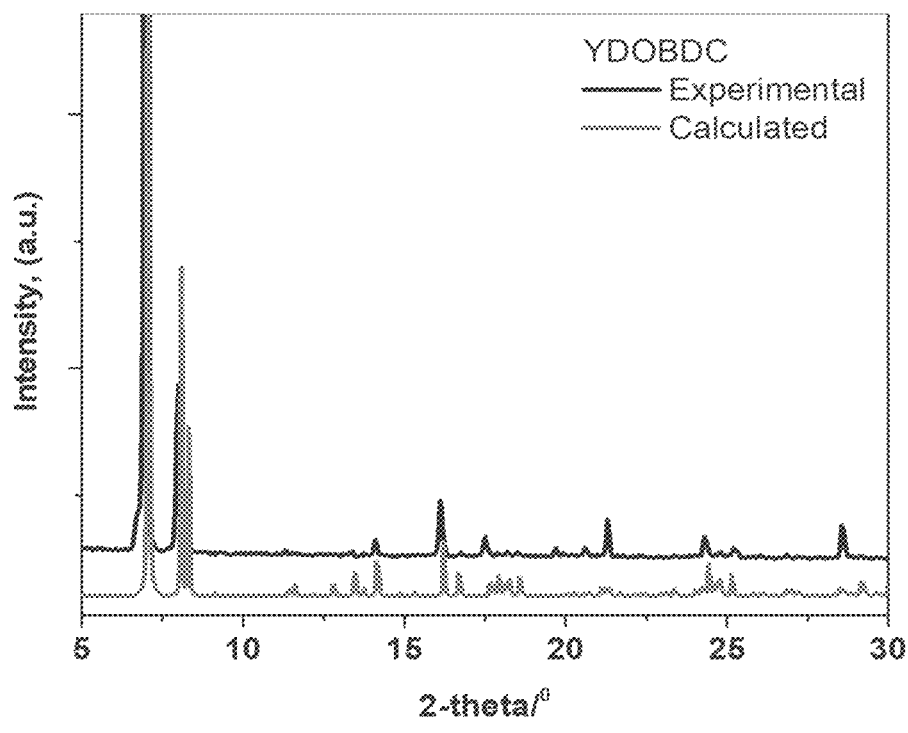
Figure 4C:
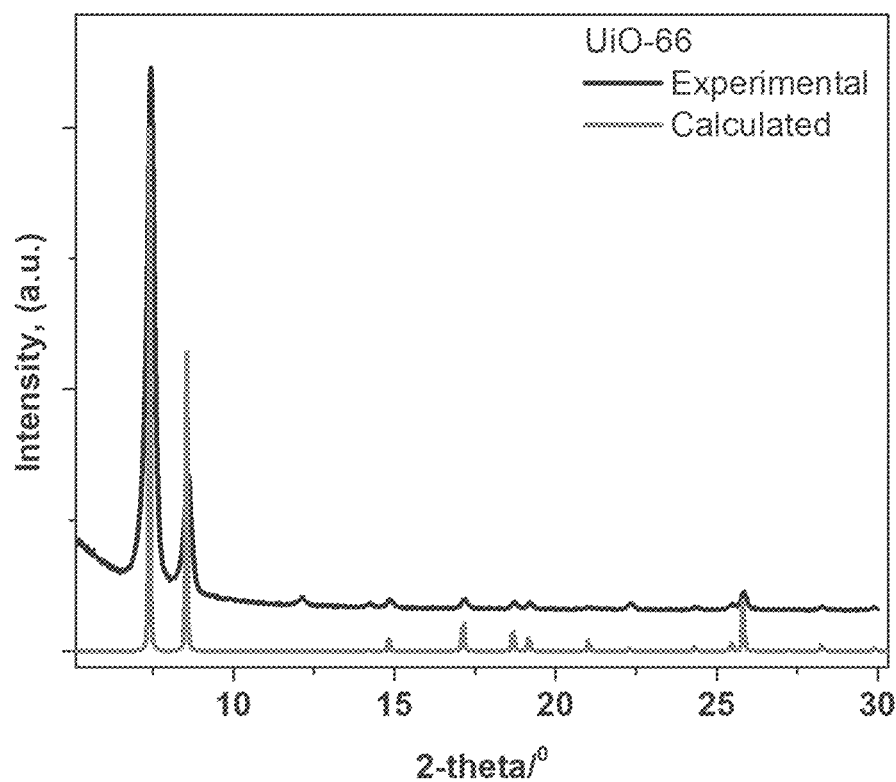
Figure 4D:
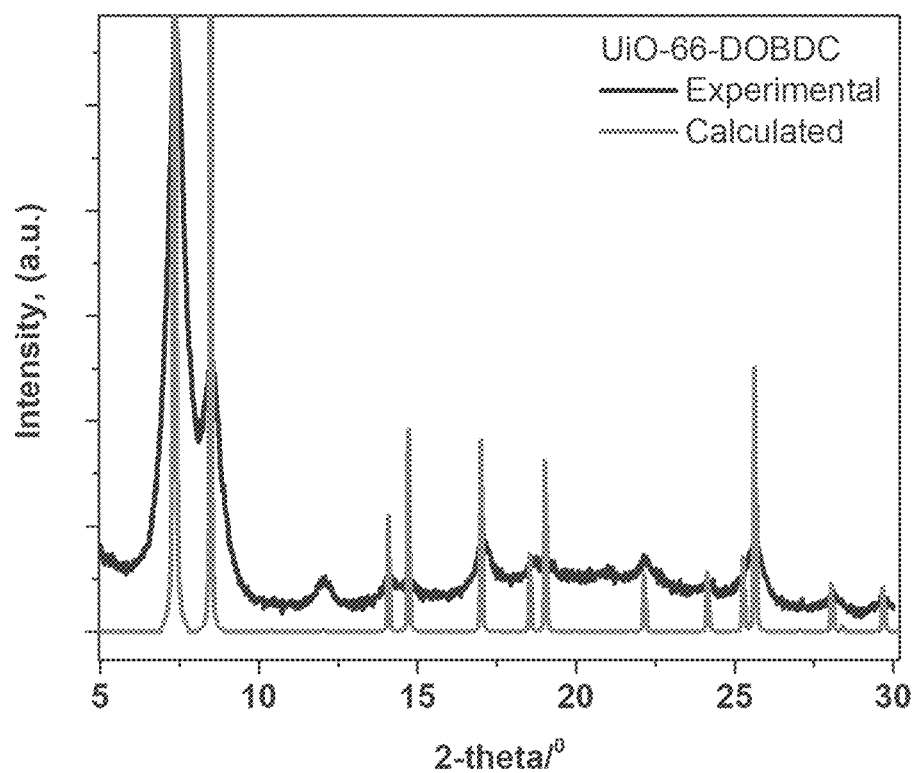

A summary of the observed modes and frequencies from the simulated spectrum viewed in J-ICE (see, e.g., Canepa P et al., "J-ICE: a new Jmol interface for handling and visualizing crystallographic and electronic properties," *J. Appl. Cryst.* 2011; 44:225-9) are shown in Table 2, and we note that the assignment of modes in the UiO-66 structure is in agreement with previous studies (see, e.g., Valenzano L et al., "Disclosing the complex structure of UiO-66 metal organic framework: a synergic combination of experiment and theory," *Chem. Mater.* 2011; 23:1700-18; and Atzori C et al., "Effect of benzoic acid as a modulator in the structure of UiO-66: an experimental and computational study," *J. Phys. Chem. C* 2017; 121:9312-24). These findings validate the DFT methods used, as the computationally optimized structures closely match the experiments. In particular, the good agreement between simulated and experimental UiO-66-DOBDC spectra suggests that the computationally proposed UiO-66-DOBDC structure is accurate, which is also confirmed by experimental PXRD (FIG. 4D).

It is important to note that while UiO-66 and UiO-66-DOBDC are isostructural, there are several characteristic differences in their IR spectra. For example, the band at ~1380 cm$^{-1}$ in UiO-66 includes several ring stretches and bends, most notably a C=C—H bend and C—C stretch+H—C=C—H rocking mode. The addition of the OH groups to the linker causes this band to split with a new band at 1430 cm$^{-1}$, which is a combination of C=C stretch and H—C=C—O—H rocking modes in the UiO-66-DOBDC spectrum (FIG. 7A). A new band also appears at 1237 cm$^{-1}$ for UiO-66-DOBDC which is a H—C=C—O—H rocking and scissoring mode (FIG. 7B).

Conversely, while the identity and coordination geometry of the metal plays a significant role in the structure that is formed (UiO-66-DOBDC versus RE-DOBDC materials), there are only minor differences in their spectroscopic signature peaks. However, subtle differences do exist, as evidenced by the shoulder that appears on the band at 1315 cm$^{-1}$ (FIG. 7C), which is a carboxylic acid C—O—H bend on the monodentate ligands, representative only for the Y and EuDOBDC structures (FIG. 7D).

Example 6: Catalytic Activity

Figure 8:
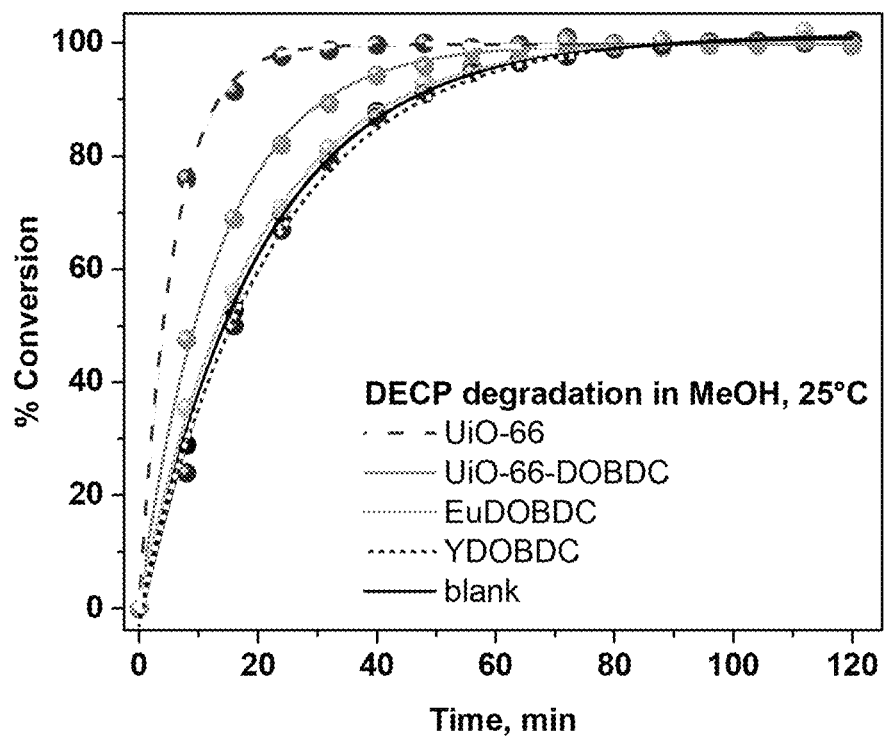
FIG. 8 provides room temperature degradation of DECP in MeOH; MeOH blank (black), UiO-66 (dashed), UiO-66-DOBDC (gray), EuDOBDC (light gray), and YDOBDC (dotted).
Figure 9:
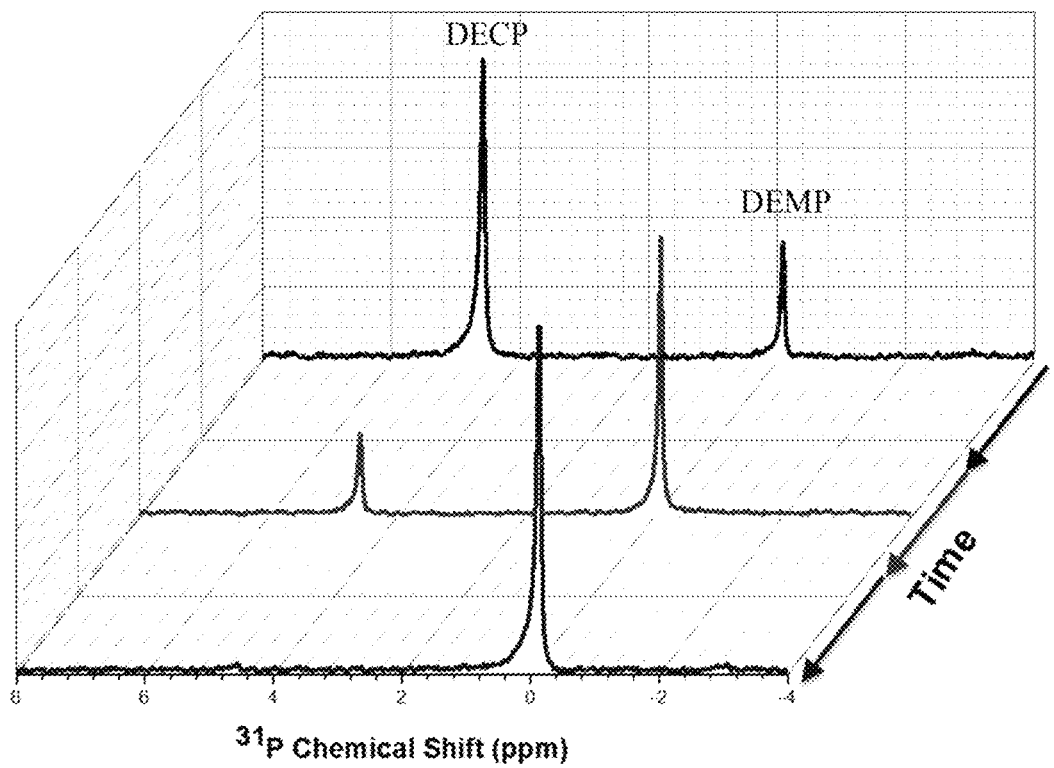
FIG. 9 shows a representative $^{31}$P NMR plot for DECP degradation in MeOH.

The catalytic activity of EuDOBDC, YDOBDC, UiO-66-DOBDC, and UiO-66 in methanol was first probed using diethyl chlorophosphate (DECP) (FIG. 8). DECP was chosen as the primary screening simulant due to its lower toxicity compared to the other two simulants, dimethyl 4-nitrophenylphosphate (DMNP) and diisopropyl-fluoro-phosphate (DFP) (FIG. 2). Importantly, the degradation process was monitored by $^{31}$P nuclear magnetic resonance (NMR) spectroscopy, as it provides unique insights into the reaction events. Also, it unambiguously confirms the catalytic degradation of the guests, as opposed to physical adsorption, which could be facilitated by the porosity in MOFs. Lastly, the experiment was monitored in situ, reducing or eliminating human error. A representative plot showing the reagent and degradation product chemical shifts over time is depicted in FIG. 9.

Interestingly, methanol alone causes breakdown of DECP (FIG. 8). Although previous reports indicated accelerated methanolysis of paraoxon via La-based catalysts (see, e.g., Tsang J S et al., *J. Am. Chem. Soc.* 2003; 125:7602-7; Melnychuk S A et al., *Angew. Chem. Int. Ed.* 2006; 45:1767-70; and Totten R K et al., *ACS Catal.* 2013; 3:1454-9), the RE-DOBDC materials studied here do not have a substantial effect on the decomposition process. Under the same conditions, both Zr-based MOFs present significantly higher activities. UiO-66-DOBDC decreases the half-life to 8.2 min compared to the MeOH blank of 12.3 min (Table 3). The highest activity is achieved by UiO-66, which results in a half-life of 5.1 min.

TABLE 3

Representative half-lives of DECP degradation in MeOH at room temperature

| Sample | $t_{1/2}$, min |
|---|---|
| UiO-66 | 5.1 |
| UiO-66-DOBDC | 8.2 |
| EuDOBDC | 11.6 |
| YDOBDC | 12.3 |
| MeOH | 12.3 |

Figure 10A:
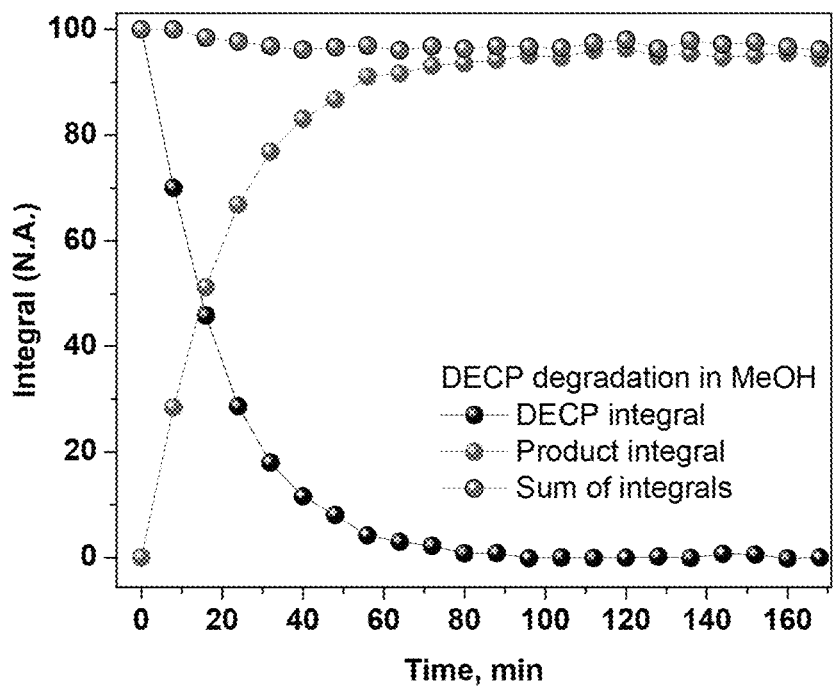
FIG. 10A-10B shows the sum of product and reactant $^{31}$P NMR peak integrals for DECP degradation in (A) MeOH blank and (B) UiO-66.
Figure 10B:
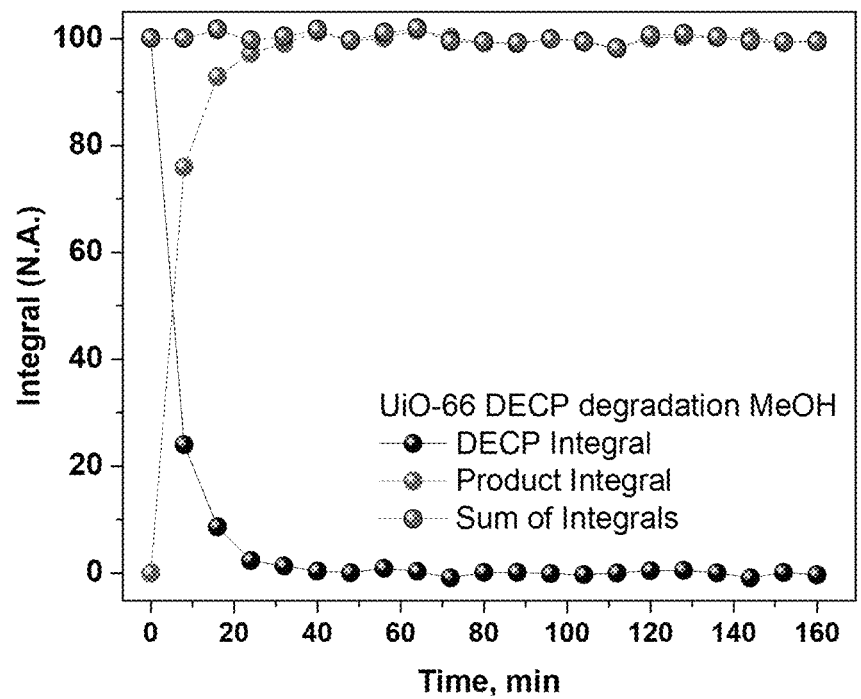

Importantly, DECP degradation in MeOH occurs via a catalytic process as evidenced by the sum of product and reactant peak integrals (FIG. 10A-10B). The breakdown product for DECP is diethyl methyl phosphate, DEMP, formed from the cleavage of the P—Cl bond of DECP via an $S_N2$ reaction mechanism (see, e.g., Yang Y C et al., "Decontamination of chemical warfare agents," *Chem. Rev.* 1992; 92:1729-43; and Alam T M et al., "Sub-equimolar hydrolysis and condensation of organophosphates," *ChemistrySelect* 2016; 1:2698-705).

Figure 11:
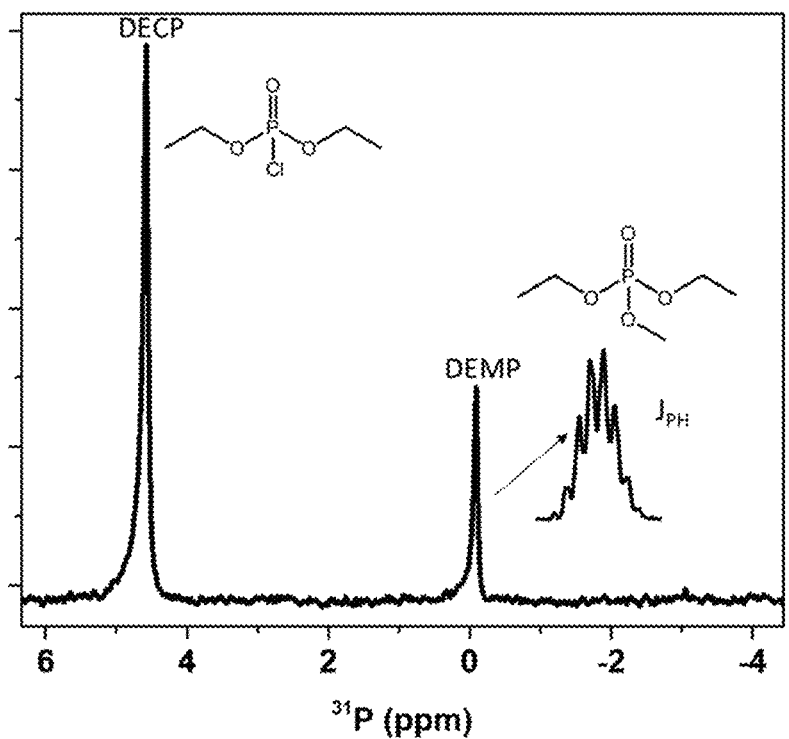
FIG. 11 shows high resolution $^{31}$P NMR spectra showing the breakdown of DECP in MeOH into the DEMP product. Inset shows the multiplet signal from $^1$H-coupled $^{31}$P NMR.

In order to confirm the identity of the DEMP product, a $^1$H-coupled $^{31}$P NMR experiment was conducted. An octet multiplet was observed, inset FIG. 11, which shows seven different $^1$H-$^{31}$P interactions, associated with the nearest H atoms in the vicinity of the P atom.

Figure 12:
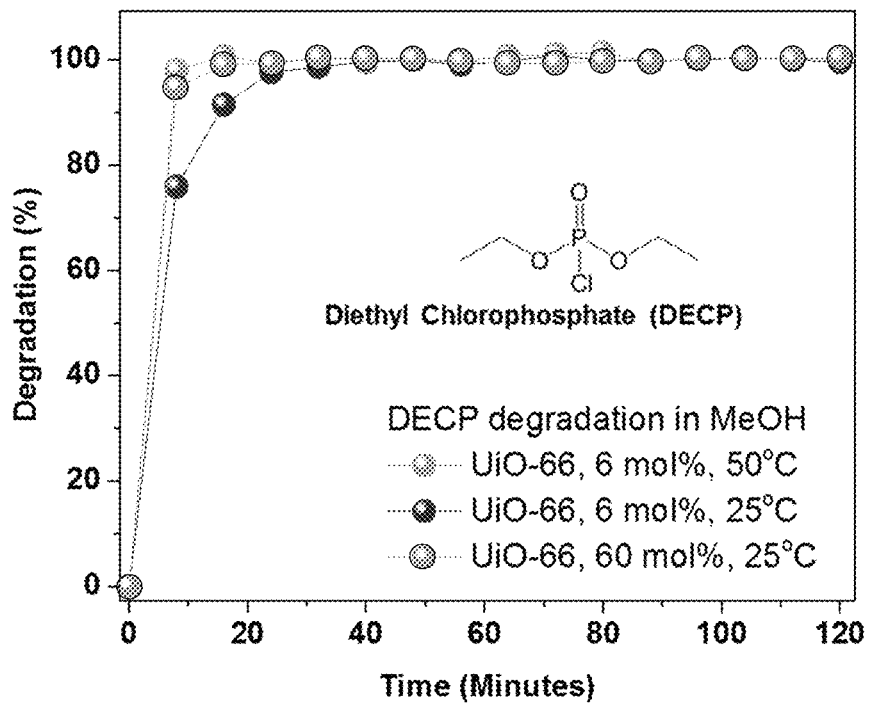
FIG. 12 shows UiO-66 supported degradation of DECP in MeOH as function of temperature and amount of catalyst as determined from $^{31}$P NMR.

DECP degradation kinetics in MeOH is further improved with temperature and amount of catalyst used (FIG. 12). As such, when the temperature is increased to 50° C., UiO-66 has an accelerated half-life of 1.4 min (Table 4). Also, a 10-fold increase in the catalyst concentration results in accelerated kinetics, with a 3.4 min half-life.

TABLE 4

Representative half-lives of UiO-66 supported degradation of DECP in MeOH as function of temperature and amount of catalyst

| Sample | $t_{1/2}$, min |
|---|---|
| UiO-66, 6 mol %, 50° C. | 1.41 |
| UiO-66, 60 mol %, 25° C. | 3.35 |
| UiO-66, 6 mol %, 25° C. | 7.58 |

Figure 13:
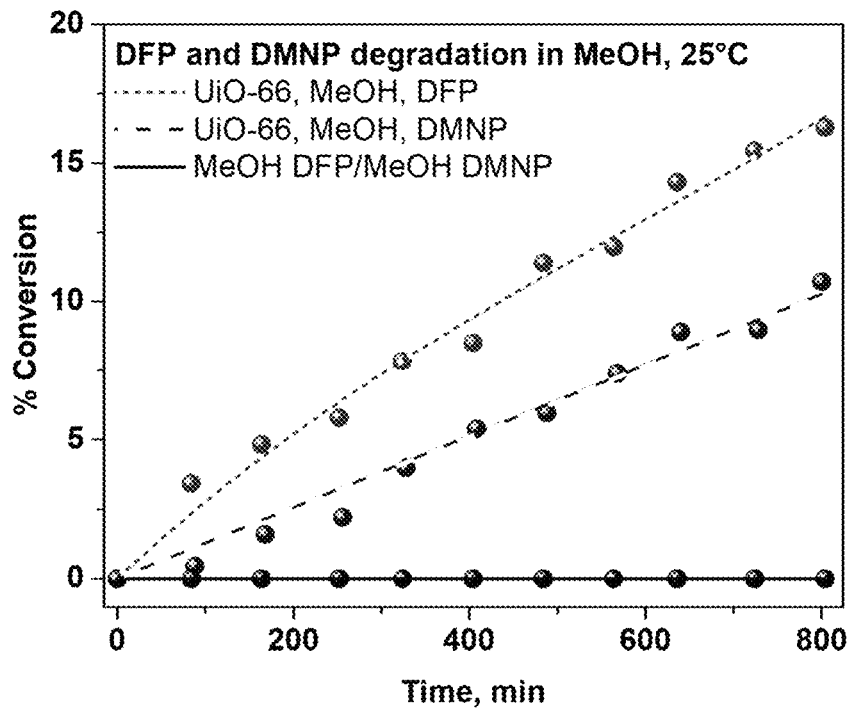
FIG. 13 shows UiO-66 supported degradation of DMNP (dashed line) and DFP (dotted line) in MeOH; MeOH/DMNP and MeOH/DFP blank (solid line). All experiments were conducted at 25° C.

Motivated by the importance to establish reactivity trends for the methanolysis of organophosphates, UiO-66 was further tested against DMNP and DFP (FIG. 13). Under the same conditions as those used for DECP, the catalytic degradation of these compounds is much slower than that of DECP. Also, it is important to note that MeOH alone does not exhibit any noticeable reactivity towards the degradation of DMNP and DFP in the time frames investigated. Based on these results, it can be inferred that the degradation of fluorophosphates (DMNP, DFP) in MeOH presents considerably slower reaction kinetics as compared to those of the chlorophosphate-based molecules (DECP).

Figure 14:
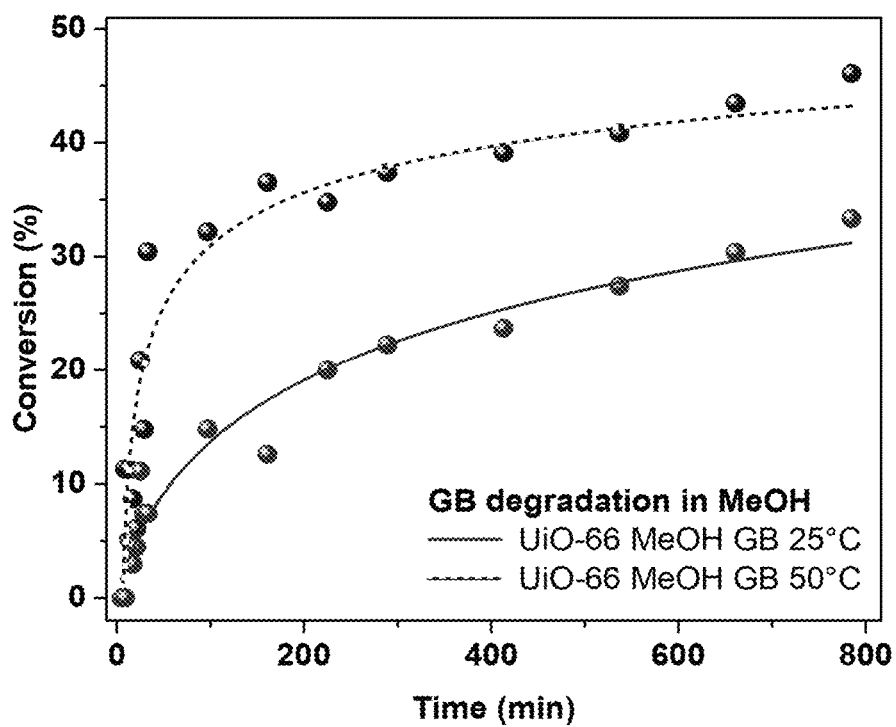
FIG. 14 shows UiO-66 supported degradation of GB in MeOH at 25° C. (solid line) and 50° C. (dashed line).

Finally, the effectiveness of UiO-66 to degrade GB in methanol was investigated (FIG. 14). To the best of our knowledge, this is the first experimental report that probes the reactivity of UiO-66 against GB. It was found that a slow decomposition reaction proceeds in MeOH alone, in the absence of the catalyst, in contrast to no reaction observed in the case of DMNP and DFP. As a result, the degradation of GB in MeOH at 25° C. is faster than that of both DFP and DMNP. The reactivity is considerably increased with an increase in temperature to 50° C., and close to 50% conversion is reached after 13 h. The reactivity profiles at room temperature and 50° C. are comparable, presenting an initial spike in the first 30 min. The reaction proceeds significantly slower after this timepoint, indicating a possible catalyst poisoning. The breakdown product of GB in methanol is likely the phosphonate anion (MeP(O)(OR)O—). In order to form the ester during the fluoride replacement, the presence of amine is required (see, e.g., Weinberger M A et al., "Mechanism of the reaction of sarin with methanol in the presence of amines," *Can. J. Chem.* 1970; 48:1358-61).

To explain the reactivity trends observed in this study, the effect of specific framework components on the degradation process is further discussed. DFT molecular modeling methods were used to calculate the vibration properties of the optimized crystal structure models (FIG. 6). The excellent correlation between experimental and simulated data validated the subtle structural features that differentiate the hexanuclear RE-based materials (EuDOBDC and YDOBDC) from those based on Zr (UiO-66 and UiO-66-DOBDC).

That is, while the UiO-66 materials have all 12 bidentate linkers, the RE-analogues have only 10 bidentate linkers and two monodentate linkers (see, e.g., Sava Gallis D F et al., *ACS Appl. Mater. Interfaces* 2017; 9:22268-77). This, in conjunction with the 9-coordination sphere afforded by Eu and Y, leads to the presence of coordinatively unsaturated metal centers in the RE-based materials, a feature not observed in the ideal UiO-66 structures. The DFT-optimized structure of EuDOBDC is consistent with single crystal XRD (see, e.g., Sava Gallis D F et al., *ACS Appl. Mater. Interfaces* 2017; 9:22268-77).

Despite anticipated Lewis acid sites, the RE-based materials are less effective in the degradation of DECP (FIG. 6), as compared to those based on Zr. This result is consistent with previous findings in which the hydrolysis of phosphatidylcholine was probed against 12 metal salts (see, e.g., Kassai M et al., "Hydrolysis of phosphatidylcholine by cerium(IV) releases significant amounts of choline and inorganic phosphate at lysosomal pH," *J. Inorg. Biochem.* 2011; 105:215-23), including those of Ce(IV), Zr(IV), Hf(IV), as well as those of RE(III) metals (Eu, La, Y, and Yb). As a general trend, it was found that the RE(III) metals had greatly reduced catalytic activity when directly compared to metals in +4 oxidation state. In that case, Ce(IV) presented the highest activity, which was significantly higher than those of Zr(IV), and Hf(IV), the second and third best performing metals in the series. Additionally, a similar tendency was recently validated by Farha et al. (see, e.g., Islamoglu T et al., "Cerium(IV) vs zirconium(IV) based metal-organic frameworks for detoxification of a nerve agent," *Chem. Mater.* 2017; 29:2672-5), where it was shown that the Ce(IV) analogue of UiO-66 was more effective at the degradation of DMNP and GD in aqueous solution, as compared to the parent Zr-based UiO-66 material.

At the same time, the OH functionalities on the organic linker appear to further hinder the catalytic activity of the DOBDC-based materials. This observation is consistent with a previous study, which showed that the presence of OH functional groups slows down the hydrolysis rates of DMNP, when directly compared to $NO_2$ and $NH_2$ groups (see, e.g., Katz M J et al., "Exploiting parameter space in MOFs: a 20-fold enhancement of phosphate-ester hydrolysis with UiO-66-$NH_2$," *Chem. Sci.* 2015; 6:2286-91). Moreover, computational work in a very recent study shows that activation free energy in the hydrolysis of DMNP is higher for the UiO-66-DOBDC analogue as directly compared to UiO-66 (see, e.g., Islamoglu T et al., "Presence versus proximity: the role of pendant amines in the catalytic hydrolysis of nerve agent simulant," *Angew. Chem. Int. Ed.* 2018; 57:1949-53).

Both of RE-based materials are based on the DOBDC linker, which introduces steric hindrance via bulky OH groups. Without wishing to be limited by mechanism, it is likely the molecules are only reacting with the sites present on the external surface. To probe this hypothesis and gain a better understanding of the effect introduced by the OH functional groups in the guest mobility inside the pores, MD simulations were further implemented. The mobility of methanol in pores of UiO-66 (FIG. 15A) and of its DOBDC analog, UiO-66-DOBDC, (FIG. 15B) was compared using model systems with four methanol molecules initially placed in a single cage of each structure. This represents maximum loading for that cage, and no other methanol molecules were present in the models to facilitate inter-cage movement by the molecules. The densely packed points correlate with reduced mobility and a more favorable location for the molecules within the cage. Methanol movement between cages in UiO-66 (FIG. 15A) is depicted by squares in a new region of space.

Figure 15A:
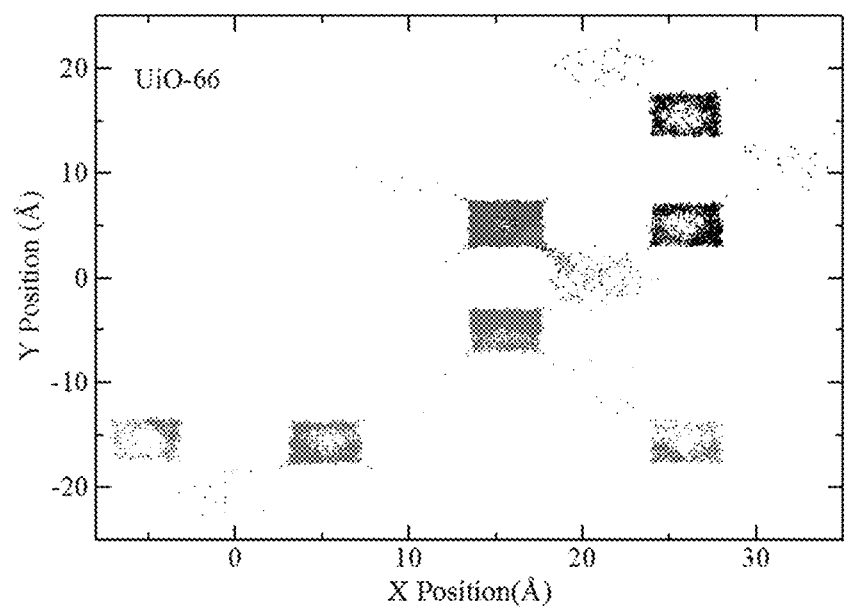
FIG. 15A-15B shows the position of the carbon atom at each MD timestep of four different methanol molecules (depicted in red, black, purple and blue) in the XY plane initially placed in the same cage of (A) UiO-66 and (B) UiO-66-DOBDC. The limited mobility of molecules in UiO-66-DOBDC is demonstrated by superimposing the atom trajectories on a molecular model of the framework at the same scale.
Figure 15B:
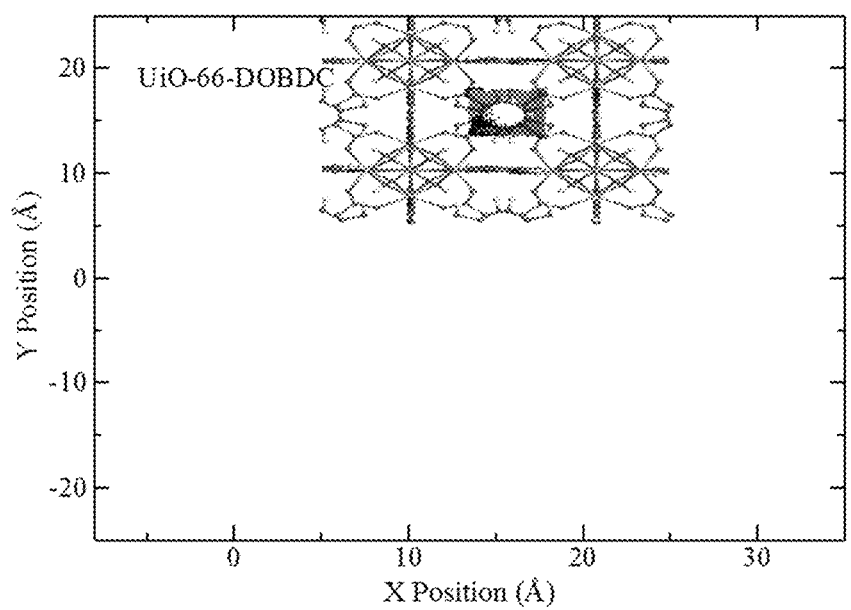

From the MD results in FIG. 15A, it is evident that methanol adsorbed in UiO-66 material is quite mobile. In the case of the UiO-66-DOBDC (FIG. 15B), the methanol molecules only exchange locations within the same cage, indicating reduced diffusion due to the steric hindrance of the hydroxyl groups on the linker. These results support the experimental results discussed in detail above, which showed reduced reactivity in all of the DOBDC-based materials.

In this context, particle size and surface area are also important parameters to consider in this discussion. Interestingly, the results indicate that under the experimental conditions studied here, particle size does not play a critical role in accelerating the reactions kinetics of DECP with MeOH. This is best illustrated by the Eu and YDOBDC samples. The two materials have very related reactivity profiles, although their particles sizes differ by a few orders of magnitude. Uniquely, UiO-66-DOBDC has the lowest surface area, but higher activity than Eu and YDOBDC, indicating that metal identity plays an important role in the catalytic process. It is worth pointing out that guest binding and reaction in UiO-66 structures have been suggested to occur at under-coordinated Zr sites, which can form when linkers are missing or bind in a monodentate fashion (see, e.g., Bai Y et al., *Chem. Soc. Rev.* 2016; 45:2327-67). Furthermore, species such as alcohols have been shown to impede solvolysis via H-bonding with the active catalytic site in the secondary building unit of UiO-66 (see, e.g., Ploskonka A M et al., "Tailoring the adsorption and reaction chemistry of the metal—organic frameworks UiO-66, UiO-66-$NH_2$, and HKUST-1 via the incorporation of molecular guests," *ACS. Appl. Mater. Interfaces* 2017; 9:21579-85).

Lastly, in an effort to identify the most appropriate simulant for GB's activity in methanol, the catalytic activity of UiO-66 against DMNP, DFP, and GB was investigated. Interestingly, the reactivity profiles for both simulants and the CWA agent appear to run in parallel (FIGS. 13-14), indicating related conversion mechanisms. As a result, it is apparent that nitro- and fluorophosphates are better surrogates to mimic the reactivity of GB in methanol, as compared to chlorophosphate-based molecules.

Here, we undertook a systematic study geared towards developing MOF-based decontamination strategies for organophosphorous compounds in methanol. Our results identified some of the important parameters that affect the MOF-based solvolysis of GB and of its simulants, DECP, DMNP and DFP. Importantly, experimental results on the GB degradation on UiO-66 is reported here for the first time.

It was found that Zr (in UiO-66 and UiO-66-DOBDC) presents higher catalytic activity towards methanolysis of DECP than Y and Eu DOBDC-based analogues. This appears to be directly correlated with metal identity, but also with surface area and accessibility to the metal centers via defect sites. Molecular dynamics simulations provided additional insights regarding the steric hindrance introduced by the linker functional groups. It was shown that the diffusion of methanol molecules between adjacent cages occurs freely in UiO-66. In contrast, the diffusion is greatly impaired by the hydroxyl groups in the UiO-66-DOBDC analog. Findings indicate that both DFP and DMNP are appropriate choices to assess the reactivity of GB in MeOH.

Our results agree with previous reports that showed metals in a +4 oxidation state (Ce, Zr and Hf) are more efficient to hydrolyze phosphatidylcholine than +3 rare earth metals (Eu, La, Y, and Yb). In addition, the study verified that OH functional groups in UiO-66-DOBDC adversely affect the catalytic degradation of DECP in MeOH, as compared to UiO-66. This observation is consistent with results from two recent studies that probed the same aspects, both experimentally and computationally. Lastly, findings indicate that DFP and DMNP are appropriate choices to assess the reactivity of GB in MeOH.

Future work can focus on using predictive DFT modeling to identify key structural features (e.g., metal type and functional groups on the organic ligand) needed to increase the efficiency of the degradation process. Additional studies could investigate structural defects and constraints in the parameters for molecular simulations, and their combined effect on guest binding.

OTHER EMBODIMENTS

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A method of catalytically degrading a chemical agent, the method comprising:
    providing a metal-organic framework composition comprising a plurality of metal clusters and a plurality of ligands coordinating with the plurality of metal clusters, wherein the metal of each metal cluster comprises one or more rare earth metal ions and each of the plurality of ligands comprises a 2,5-dihydroxyterephthalic acid (DOBDC) linker;
    combining the metal-organic framework composition with the chemical agent and a non-aqueous solvent; and
    determining a rate of decomposition of the chemical agent.

2. A method of treating a contaminated article, the method comprising:
    applying a decontamination formulation to a surface of the contaminated article, wherein the decontamination formulation comprises a metal-organic framework composition and a non-aqueous solvent, and wherein the metal-organic framework composition comprises a plurality of metal clusters and a plurality of ligands coordinating with the plurality of metal clusters and wherein the metal of each metal cluster comprises one or more rare earth metal ions and each of the plurality of ligands comprises a 2,5-dihydroxyterephthalic acid (DOBDC) linker.

3. The method of claim 2, further comprising:
    reapplying the decontamination formulation to the surface after about 15 minutes or longer.

4. The method of claim 2, wherein the contaminated article comprises electronics or circuitry.

5. The method of claim 1, wherein the at least one metal cluster comprises a hexanuclear cluster.

6. The method of claim 5, wherein the hexanuclear cluster comprises Eu, Nd, Yb, Y, Tb, La, Ce, Pr, Sm, Gd, Dy, Ho, Er, Tm, or Lu.

7. The method of claim 1, wherein the plurality of metal clusters comprises a first metal ion and a second metal ion that is different than the first metal ion.

8. The method of claim 1, further comprising a particle that comprises the plurality of metal clusters and the plurality of ligands.

9. The method of claim 1, wherein the metal-organic framework composition comprises EuDOBDC, YDOBDC, NdDOBDC, YbDOBDC, TbDOBDC, $Nd_{0.67}Yb_{0.33}DOBDC$, or $Nd_{0.46}Yb_{0.54}DOBDC$.

10. The method of claim 1, wherein the non-aqueous solvent comprises an alcohol or a hydrofluoroether.

\* \* \* \* \*